United States Patent
Watanabe

(10) Patent No.: US 9,523,622 B2
(45) Date of Patent: Dec. 20, 2016

(54) LATERAL ROLLOVER LIMIT DETECTION SYSTEM

(71) Applicant: National University Corporation Tokyo University of Marine Science and Technology, Tokyo (JP)

(72) Inventor: Yutaka Watanabe, Tokyo (JP)

(73) Assignee: NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 246 days.

(21) Appl. No.: 14/363,231

(22) PCT Filed: Dec. 4, 2012

(86) PCT No.: PCT/JP2012/081322
§ 371 (c)(1),
(2) Date: Jun. 5, 2014

(87) PCT Pub. No.: WO2013/084857
PCT Pub. Date: Jun. 13, 2013

(65) Prior Publication Data
US 2014/0331748 A1 Nov. 13, 2014

(30) Foreign Application Priority Data
Dec. 6, 2011 (JP) .................. 2011-266708

(51) Int. Cl.
*G01M 1/00* (2006.01)
*G01M 1/12* (2006.01)
(Continued)

(52) U.S. Cl.
CPC .............. *G01M 1/122* (2013.01); *B60W 40/13* (2013.01); *G01M 17/06* (2013.01); *B60W 2040/1315* (2013.01)

(58) Field of Classification Search
USPC ................. 73/65.01, 65.07, 65.08, 65.09
See application file for complete search history.

(56) References Cited

U.S. PATENT DOCUMENTS 5,301,544 A * 4/1994 Smith .................. G01M 1/122
73/65.01
5,525,960 A * 6/1996 McCall .............. B60R 16/0232
116/34 R
(Continued)

FOREIGN PATENT DOCUMENTS

EP 2 090 874 A1 8/2009
JP 56-138230 A 10/1981
(Continued)

OTHER PUBLICATIONS

Shizuka Jin, Yutaka Watanabe "Sanjigen Jushin Kenchi Riron ni Motozuku Daishajo Kamotsu no Jushin Kenchi Jikken", The Society of Packaging Science & Technology, Japan Dai 20 Kai Nenji Taikai Koern Yokoshu, The Society of Packaging Science & Technology, Japan Jul. 7, 2011, pp. 112-113.

*Primary Examiner* — Clayton E Laballe
*Assistant Examiner* — Warren K Fenwick
(74) *Attorney, Agent, or Firm* — Birch, Stewart, Kolasch & Birch, LLP

(57) ABSTRACT

Provided is a lateral rollover limit detection system which can determine the lateral rollover danger of a structure for which the weight or the weight distribution has not been clarified. A placement board, springs, and detection object are provided as a structure in which the placement board is supported with springs on both sides of an oscillation central axis with an acceleration sensor for detecting the reciprocating motion in an up-down direction of the placement board, and an arithmetic part which, on the basis of the inclination angle of the placement board in a direction of rotation around the oscillation central axis with respect to (Continued)

the horizontal plane in a standstill state of the detection object and the detection result by the acceleration sensor, calculates a limit center-of-gravity height beyond which the detection object is rolled over for a center-of-gravity location on the placement board of the structure being provided.

3 Claims, 15 Drawing Sheets

(51) Int. Cl.
      *G01M 17/06*     (2006.01)
      *B60W 40/13*     (2012.01)

(56)       References Cited

U.S. PATENT DOCUMENTS

| | | |
|---|---|---|
| 6,756,890 B1 | 6/2004 | Schramm et al. |
| 8,140,228 B2 * | 3/2012 | McCabe ............... B66F 17/003 414/636 |
| 9,046,438 B2 * | 6/2015 | Watanabe ............... G01M 1/22 |
| 2003/0182041 A1 * | 9/2003 | Watson ............... B60R 21/0132 701/45 |
| 2009/0235724 A1 * | 9/2009 | Ryu ....................... G01M 1/122 73/65.01 |
| 2010/0198492 A1 * | 8/2010 | Watanabe ............. B60W 40/12 701/124 |

FOREIGN PATENT DOCUMENTS

| | | |
|---|---|---|
| JP | 4-191179 A | 7/1992 |
| JP | 6-265433 A | 9/1994 |
| JP | 11-83534 A | 3/1999 |
| JP | 2007-131301 A | 5/2007 |
| JP | 2011-133297 A | 7/2011 |
| WO | WO 2008/062867 A1 | 5/2008 |

\* cited by examiner

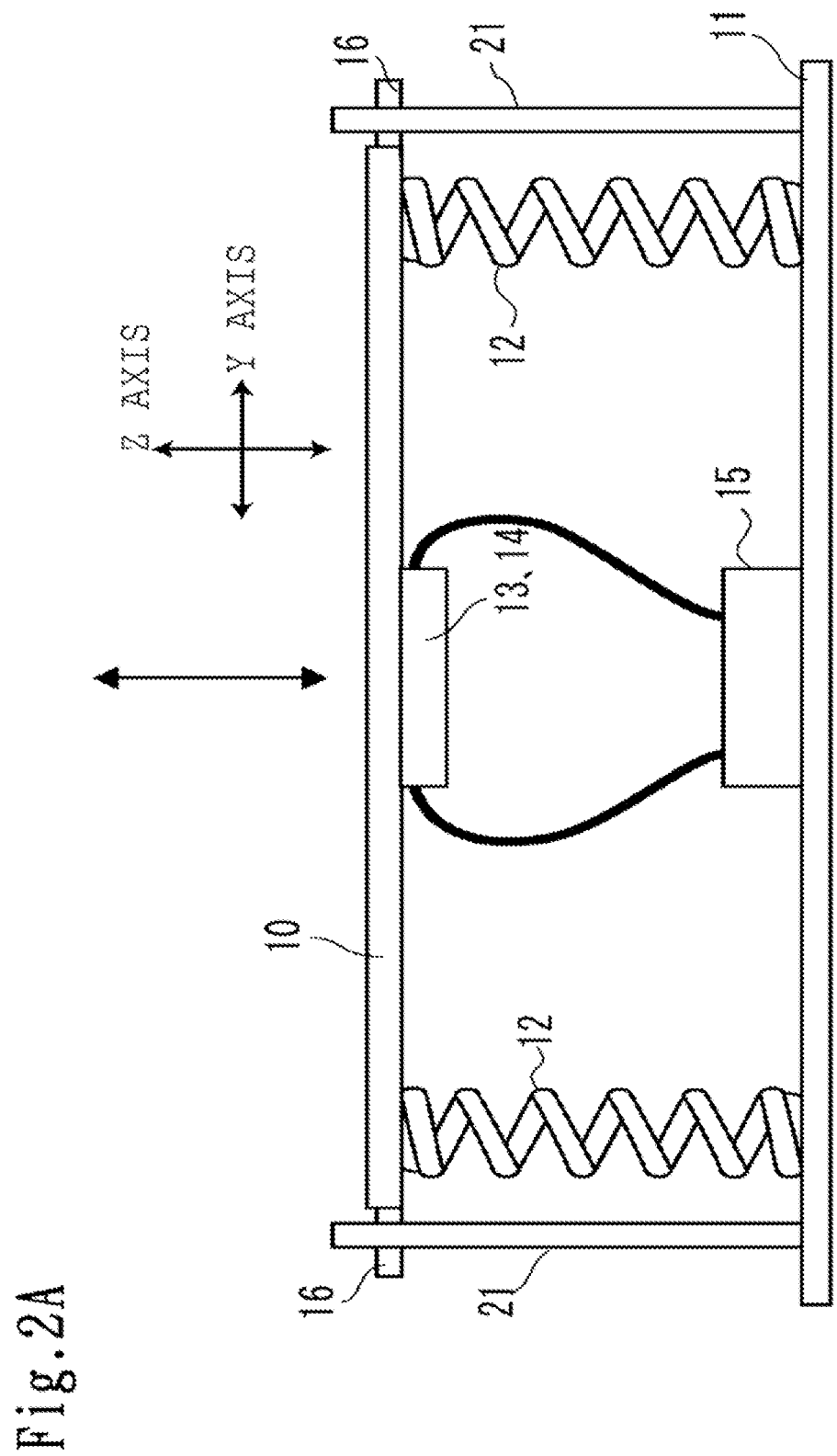

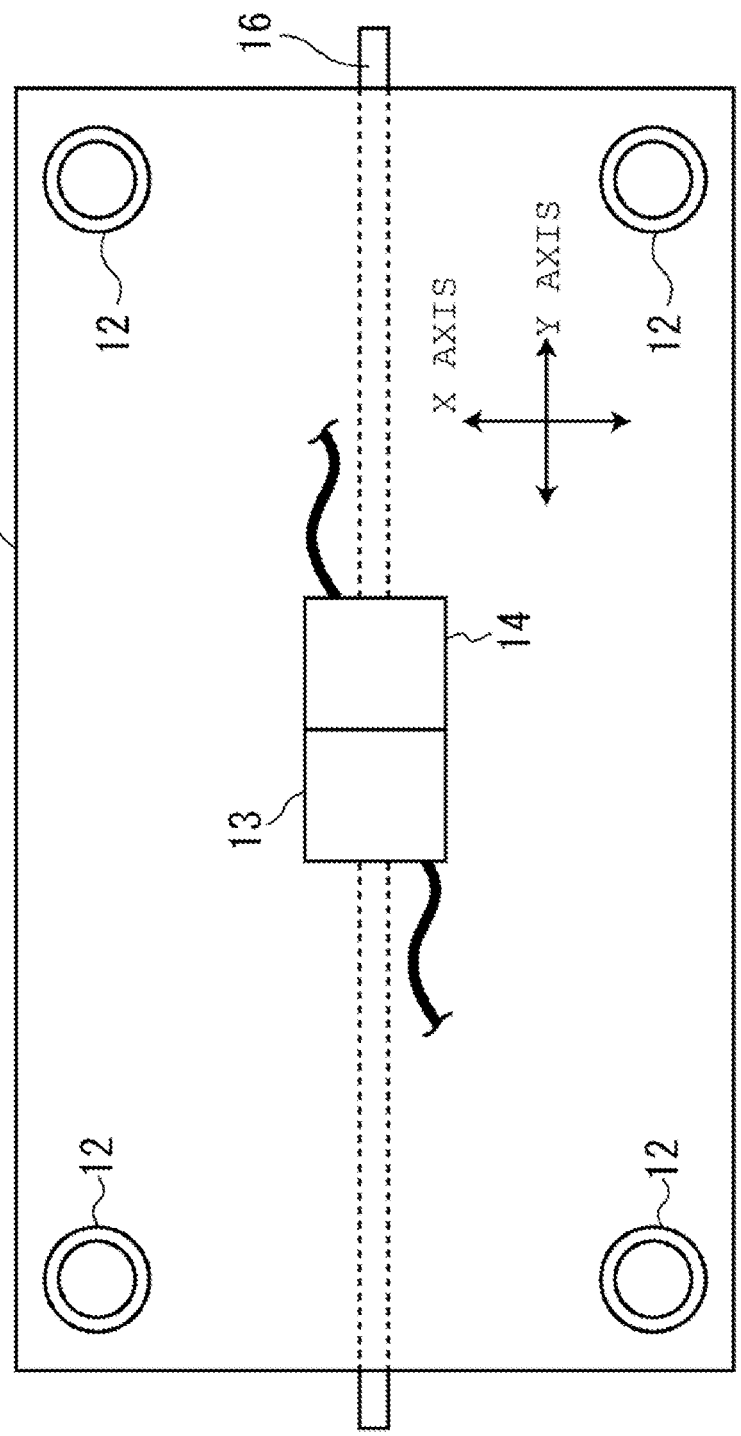

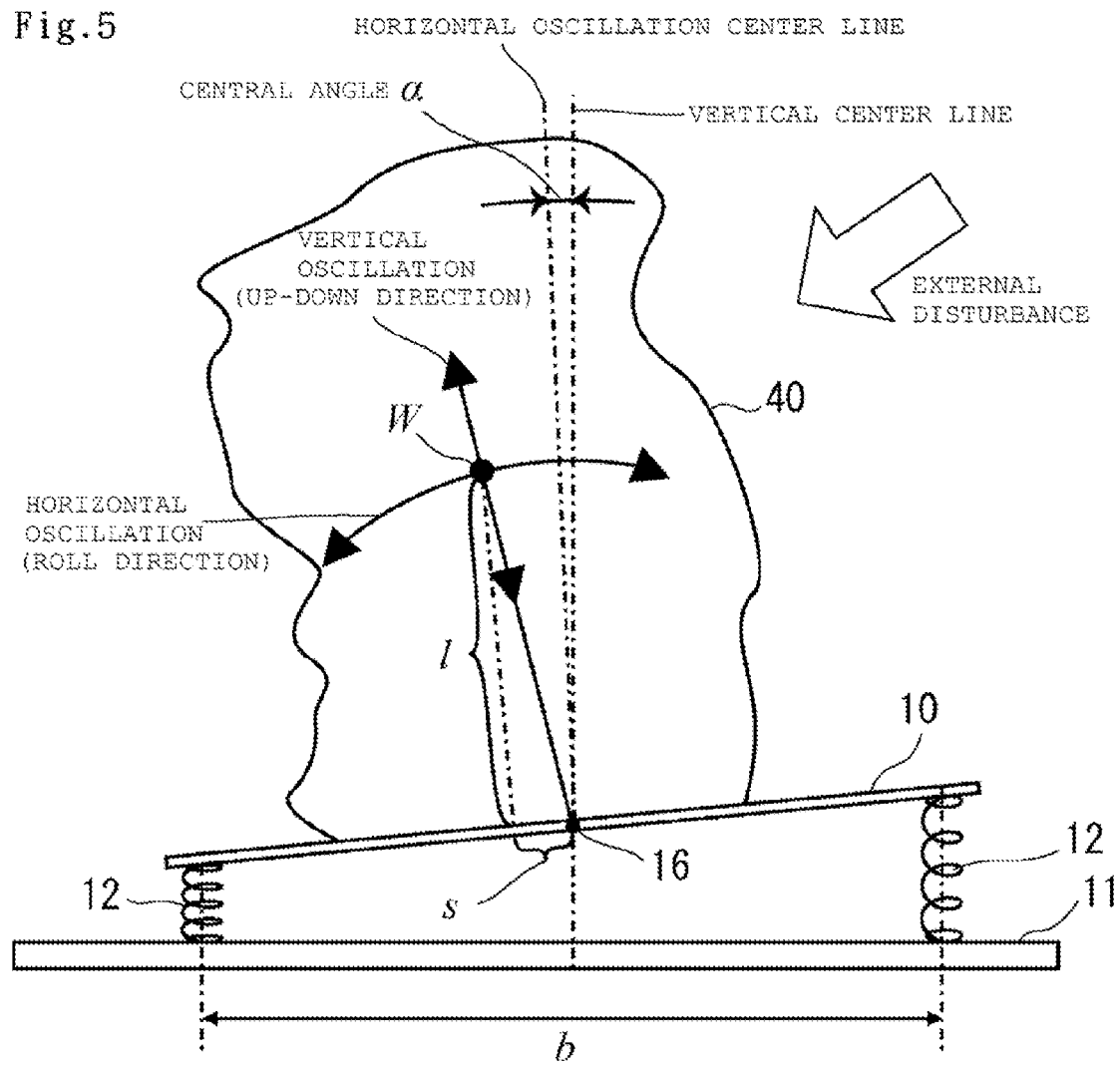

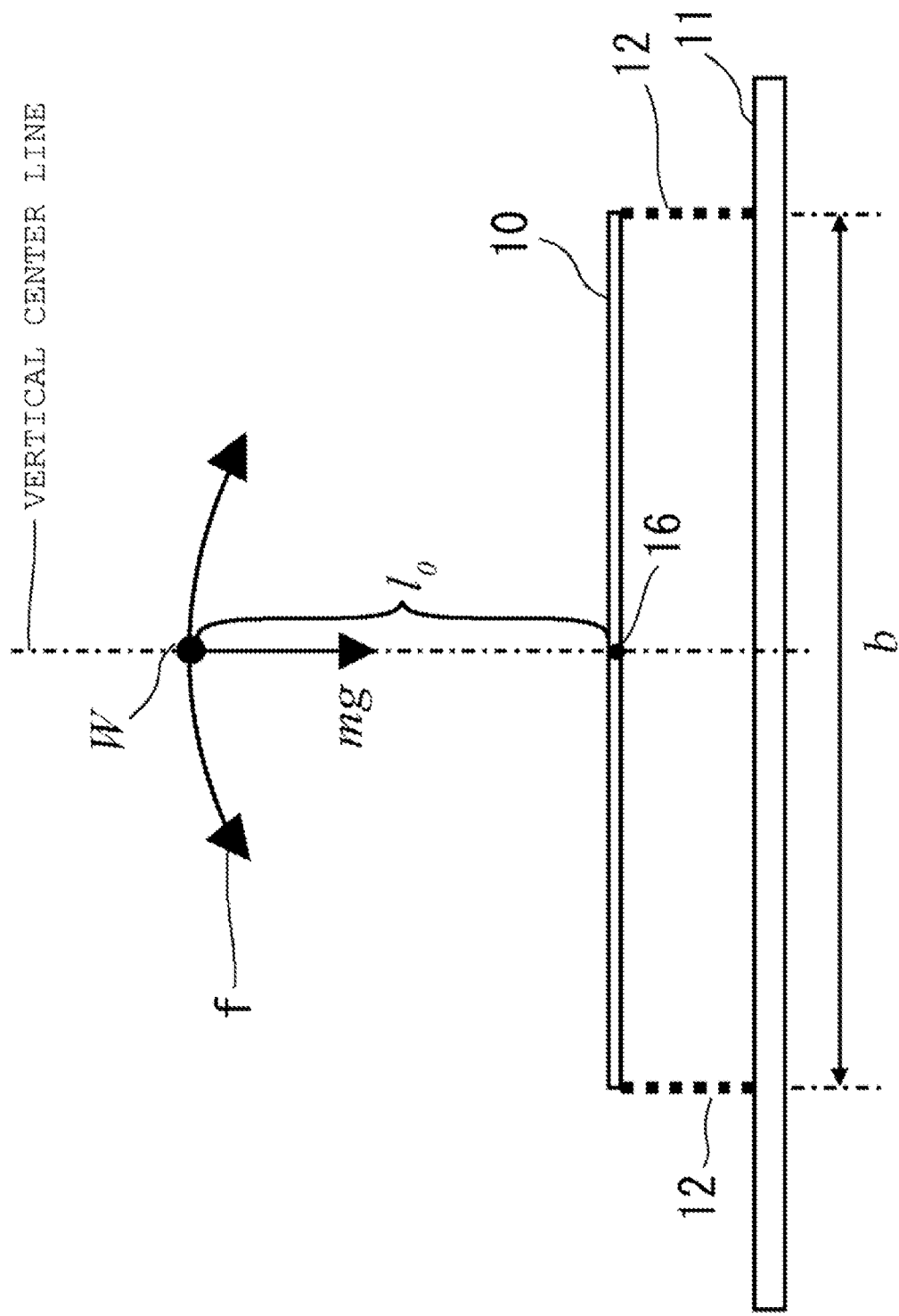

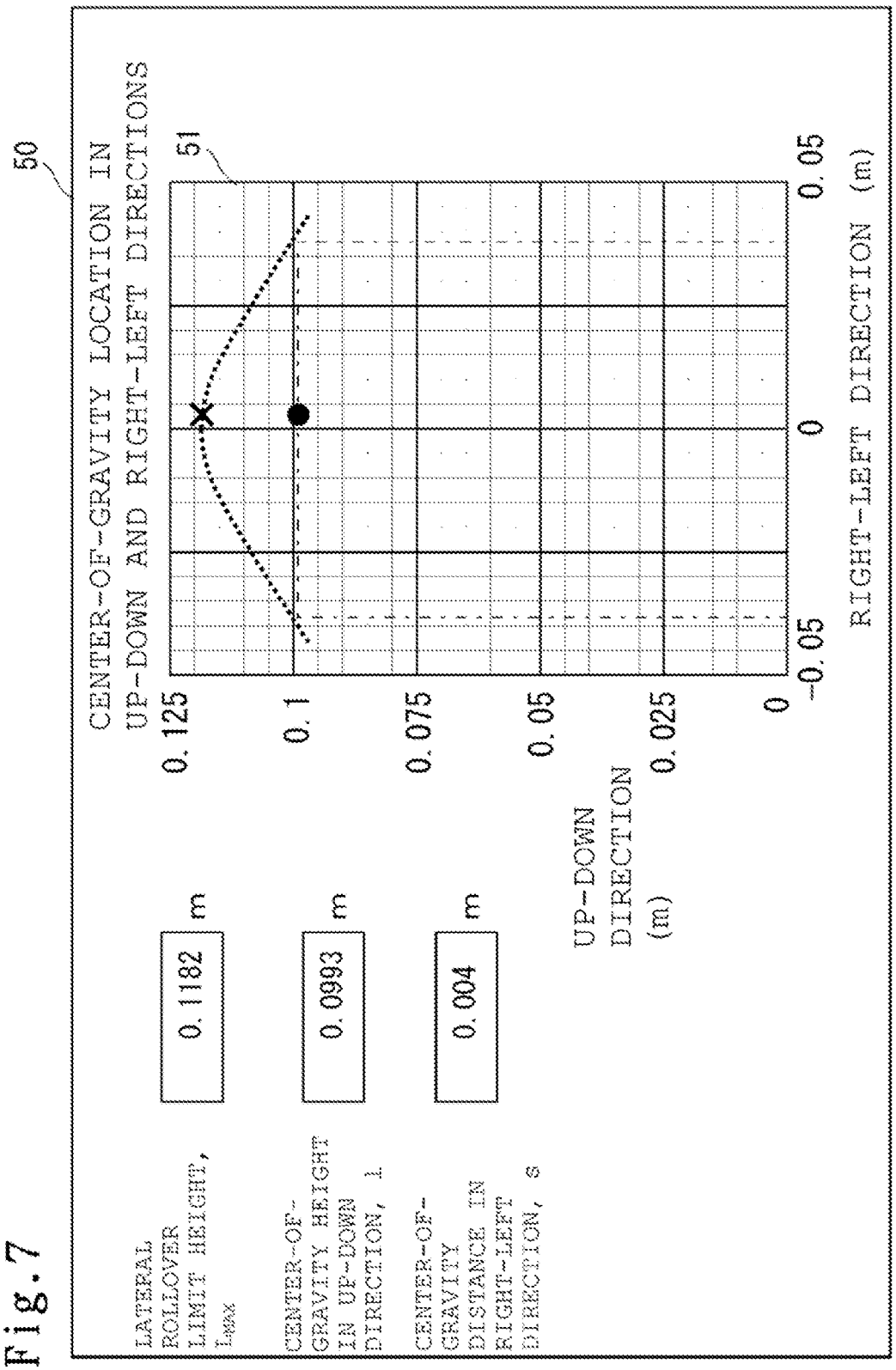

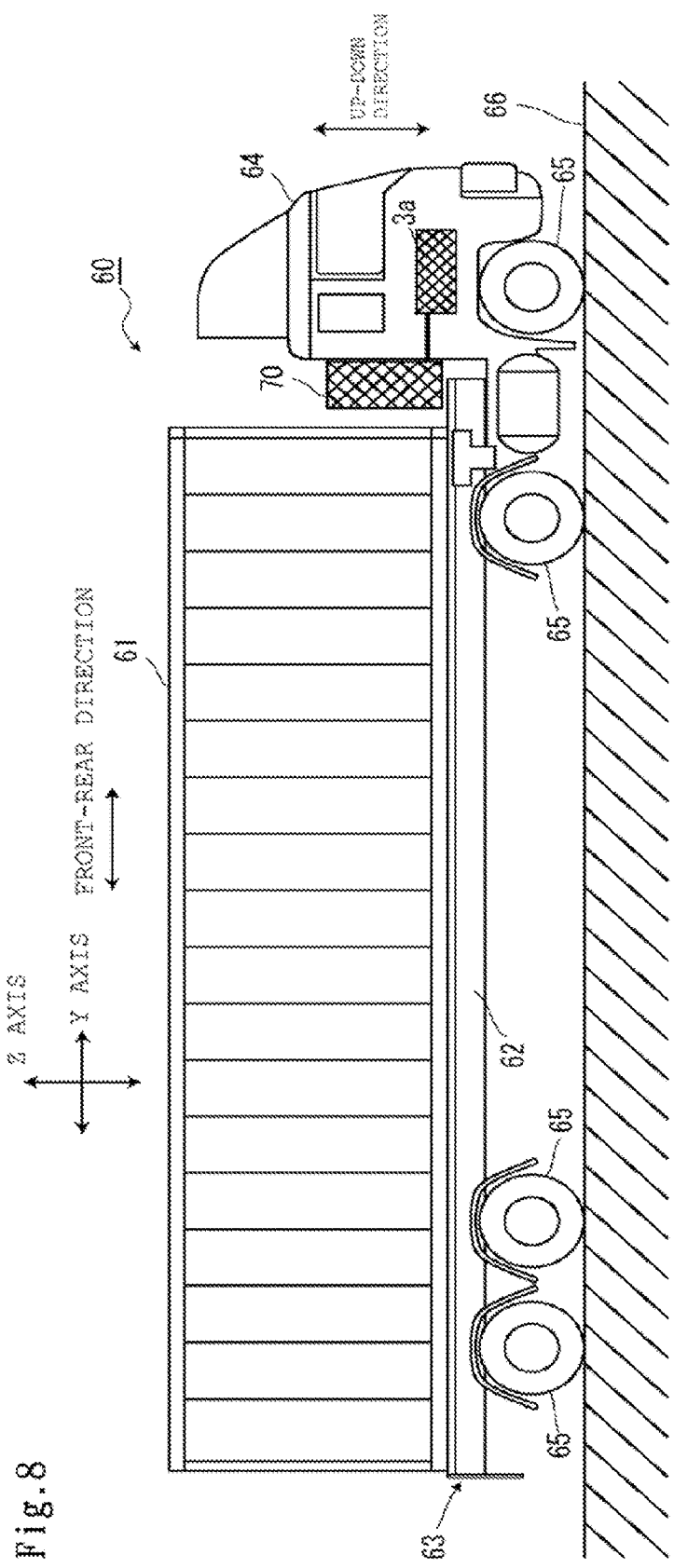

LATERAL ROLLOVER LIMIT DETECTION SYSTEM

TECHNICAL FIELD

The present invention relates to a lateral rollover limit detection system for detecting a lateral rollover limit height beyond which a lateral rollover will be caused.

BACKGROUND ART

In order to prevent a lateral rollover of a vehicle, a technique for reporting the danger of lateral rollover has been proposed (refer to, for example, Patent Documents 1 and 2).

With the invention disclosed in Patent Document 1, on a two-dimensional map in which the roll angle and the roll angular velocity of a vehicle are used as parameters, a lateral rollover limit curve is set, with a region in which the roll angle and the roll angular velocity are greater being set as a vehicle lateral rollover region, and when the history of the roll angular velocity which has been detected with a roll angular velocity sensor 1 and the roll angle exceeds the lateral rollover limit curve, entering the vehicle lateral rollover region, it is determined that there is the possibility of the vehicle being rolled over. In addition, with the invention disclosed in Patent Document 2, when the angle formed by the line connecting between the center-of-gravity location of the entire working machine and the overturning fulcrum and the vertical line (the repose angle) is greater than the limit repose angle, it is determined that the vehicle body is in a safe posture, while, when the repose angle is under the limit repose angle, it is determined that the vehicle body is in the dangerous region.

CITATION LIST

Patent Literature

Patent Document 1: Japanese Patent Application Laid-open No. 2011-006068
Patent Document 2: Japanese Patent Application Laid-open No. 2007-186953

DISCLOSURE OF THE INVENTION

Problems to be Solved by the Invention

However, the object to which the prior art is applicable has been a vehicle for which the weight or the weight distribution is clarified, and there has been a problem that it is impossible to determine the danger of lateral rollover of a structure for which the weight or the weight distribution has not been clarified in advance.

In view of the above problem, the present invention has been made in order to solve the problem of the prior art, and it is an object of the present invention to provide a lateral rollover limit detection system which calculates a limit center-of-gravity height beyond which a structure is rolled over, as a lateral rollover limit height, and on the basis of the lateral rollover limit height which has been calculated, can determine the lateral rollover danger of a structure for which the weight or the weight distribution has not been clarified in advance.

Means for Solving the Problems

The lateral rollover limit detection system in accordance with the present invention provides a lateral rollover limit detection system, including: a structure, wherein a reference plane is supported with an elastic force on both sides of a reference axis; an up-down direction detection means for detecting a reciprocating motion in an up-down direction of the reference plane, and a calculation means for calculating, on the basis of an inclination angle in a direction of rotation around the reference axis of the reference plane with respect to a horizontal plane in a standstill state of the structure, and the detection result by the up-down direction detection means, a limit center-of-gravity height beyond which the structure is rolled over in the direction of rotation as a lateral rollover limit height for a center-of-gravity location on the reference plane of the structure.

Further, in the lateral rollover limit detection system, the calculation means may calculate a center-of-gravity height beyond which the force in the direction of rotation acting on the center of gravity of the structure resulting from the elastic force is not capable of providing a righting moment against the gravity, as the lateral rollover limit height.

Further, the lateral rollover limit detection system may include a direction-of-rotation detection means for detecting a rotation around the reference axis of the reference plane, wherein the calculation means determines the inclination angle in a standstill state from the detection result by the rotation-direction detection means.

Further, in the lateral rollover limit detection system, the calculation means may determine the central angle for the oscillation around the reference axis from the detection result by the rotation-direction detection means as the inclination angle in a standstill state.

Further, in the lateral rollover limit detection system, the calculation means may determine the vertical oscillation frequency in the up-down direction for the reference plane from the detection result by the up-down direction detection means, and on the basis of the vertical oscillation frequency and the central angle for the oscillation, calculate the lateral rollover limit height.

Further, in the lateral rollover limit detection system, the calculation means may calculate a center-of-gravity height in the up-down direction from the reference axis to the center of gravity of the structure on the basis of the detection results by the up-down direction detection means and the direction of rotation detection means.

Further, the lateral rollover limit detection system may include a lateral rollover determination means for determining the lateral rollover danger in the direction of rotation of the structure on the basis of the lateral rollover limit height which has been calculated by the calculation means and the center-of-gravity height, and a reporting means for reporting the determination result by the lateral rollover determination means.

Advantages of the Invention

In accordance with the present invention, there is provided an advantage that, by calculating, on the basis of the reciprocating motion in an up-down direction of the reference plane, and the angle in a direction of rotation around the reference axis, a limit center-of-gravity height beyond which a structure is rolled over, as a lateral rollover limit height, it is capable of determining, on the basis of the lateral rollover limit height which has been calculated, the danger of lateral rollover of a structure for which the weight or the weight distribution has not been clarified in advance.

BRIEF DESCRIPTION OF THE DRAWINGS

FIG. 3 is an explanatory drawing for explaining the geometry of a placement board and disposition of springs shown in FIG. 2;

FIG. 5 is an explanatory drawing for explaining the operation of the oscillation detecting device shown in FIG. 1;

FIGS. 6A and 6B are explanatory drawings for explaining the operation of the oscillation detecting device shown in FIG. 1;

FIG. 7 is a figure giving an example of reporting screen outputted to a reporting part shown in FIG. 4;

FIG. 8 is a side view showing a configuration of a trailer truck on which there is loaded a lateral rollover limit detection system according to a second embodiment of the present invention;

BEST MODE FOR CARRYING OUT THE INVENTION

Next, embodiments of the present invention will be specifically explained with reference to the drawings.

(First Embodiment)

Figure 1:
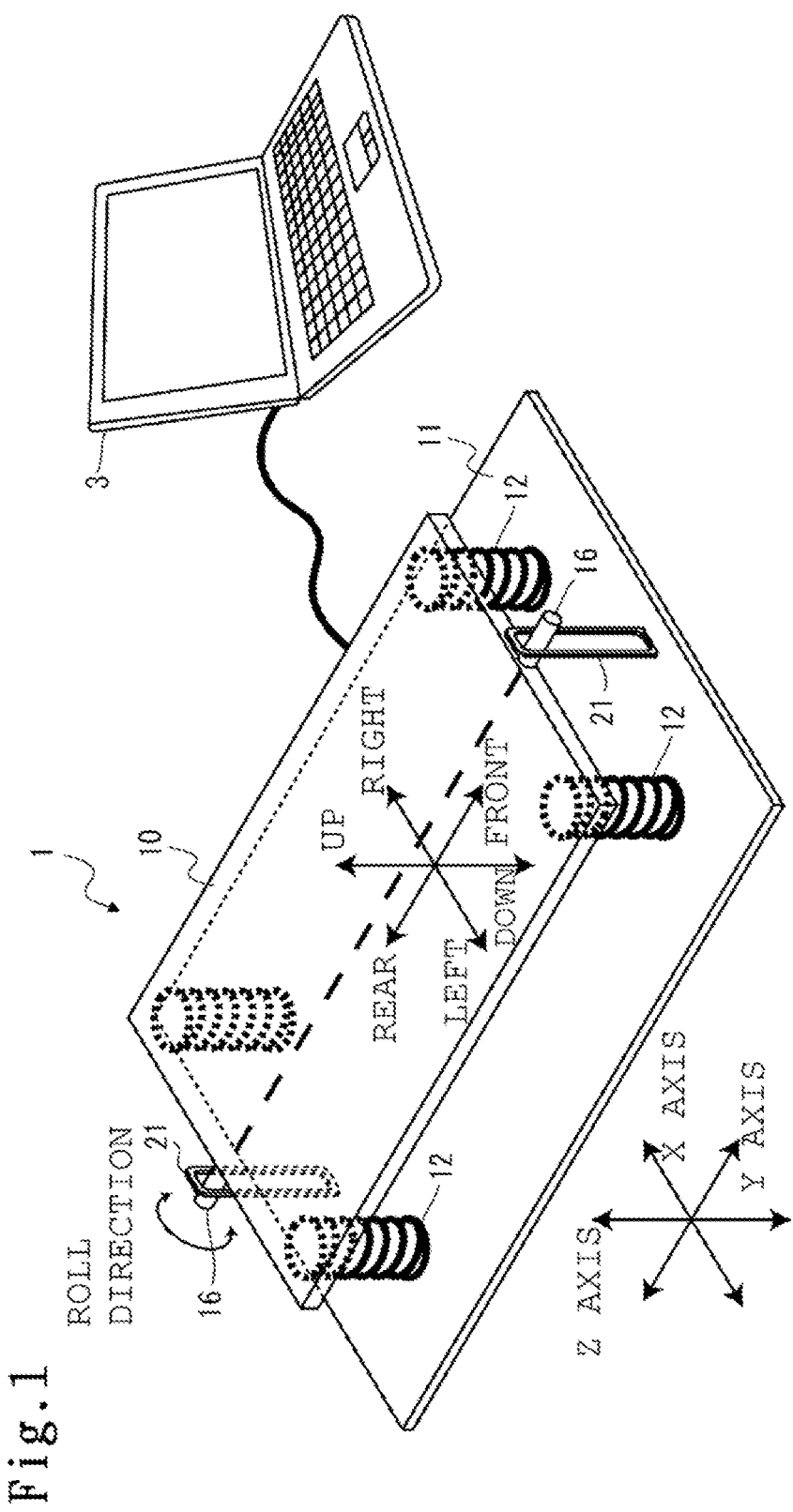
FIG. 1 is a perspective view showing a configuration of a lateral rollover limit detection system according to a first embodiment of the present invention.

Referring to FIG. 1, a lateral rollover limit detection system of a first embodiment includes an oscillation detecting device 1 and a data processing apparatus 3. The oscillation detecting device 1 includes a placement board 10 for placing a detection object thereon, detecting an oscillation (characteristic vibration) of the detection object that is placed on the placement board 10. The data processing apparatus 3 is an information processing apparatus, such as a personal computer, determining the lateral rollover limit height and the center-of-gravity height and center-of-gravity location of the detection object on the basis of the oscillation (characteristic vibration) of the detection object that has been detected by the oscillation detecting device 1. The lateral rollover limit height is a limit center-of-gravity height beyond which a detection object placed on the placement board 10 is rolled over, which means that, in the case where the center of gravity of the detection object is not located under the lateral rollover limit height on the placement board 10, the detection object will be rolled over. In addition, the terms, such as lateral rollover, overturning, and turnover, are considered as synonyms which express that the stability of the center of gravity of a subject cannot be held, and the rotational motion is progressed, resulting in the subject inevitably falling or collapsing in the gravitational direction. Hereinbelow, in the present embodiment and the other embodiments, the term "lateral rollover" will be adopted as a representative one for use as a generic term to express such a phenomenon.

Figure 2B:
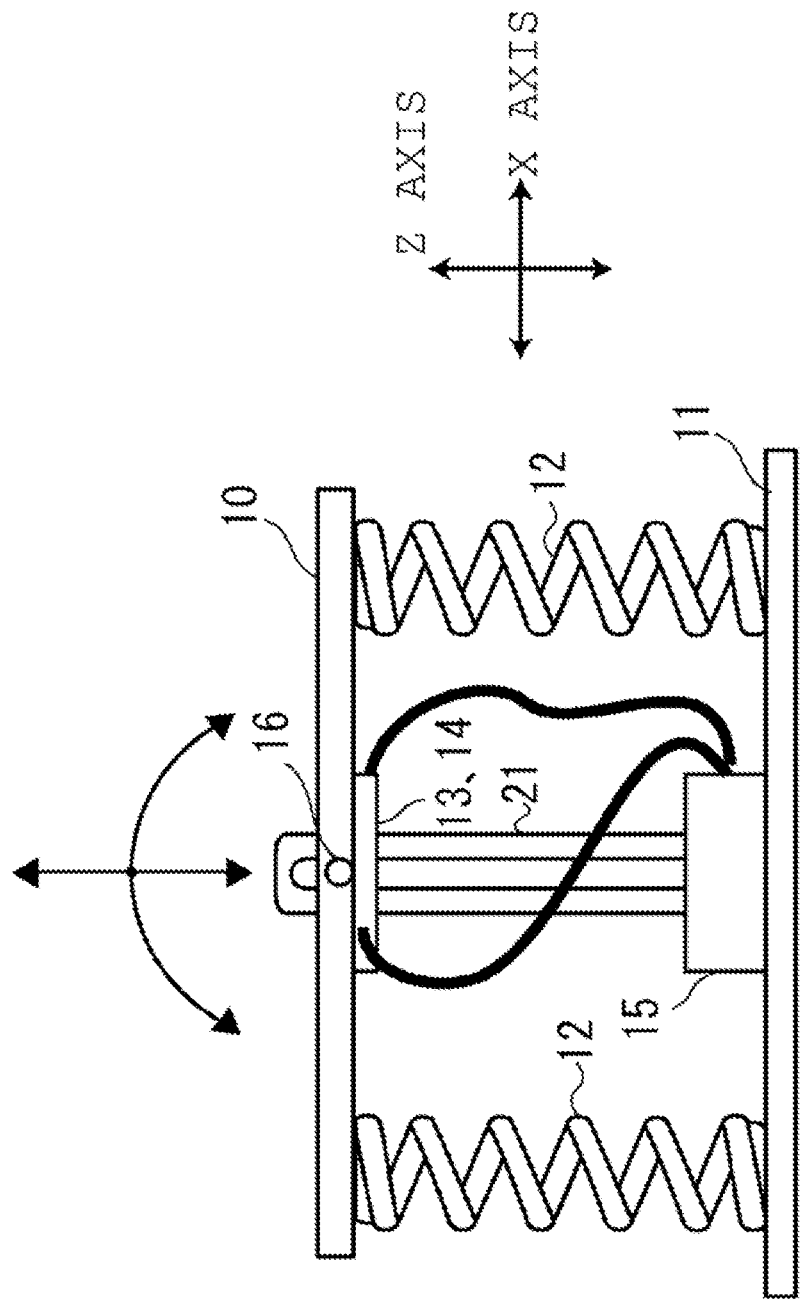
FIG. 2 is a side view of an oscillation detecting device shown in FIG. 1.

Referring to FIG. 1 and FIG. 2, the oscillation detecting device 1 includes the placement board 10 for placing the detection object thereon, serving as the reference plane, and springs 12 which are planted into a bottom plate 11 for supporting the placement board 10. FIG. 2A is a side view when the oscillation detecting device 1 is viewed from an X-axis direction shown in FIG. 1, while FIG. 2B is a side view when the oscillation detecting device 1 is viewed from a Y-axis direction shown in FIG. 1.

Referring to FIG. 1 and FIG. 3, the placement board 10 is a rectangular board having a flat surface functioning as a placing surface on which the detection object can be placed on. In the placement board 10, a roll direction oscillation central axis 16 which is in parallel with the placing surface, serving as the reference axis, is formed such that it is protruded from both ends of the placement board 10. FIG. 3 is a figure when the placement board 10 is viewed from the rear face thereof. As the placement board 10, any material, such as wood or plastic, can be used, however, it is preferable that the material be sufficiently light-weight, as compared to the detection object. The placement board 10 is a flat plate with which the weight distribution is uniform, and is configured to have a geometry which is line-symmetrical about the oscillation central axis 16. Therefore, the center of gravity on the placing surface of the placement board 10 is located on the oscillation central axis 16.

In the first embodiment, as shown in FIG. 1, the direction perpendicular to the placing surface of the placement board 10 is defined as an up-down direction; the direction parallel to the oscillation central axis 16 as a front-rear direction; and the direction parallel to the placing surface of the placement board 10 and orthogonal to the oscillation central axis 16 as a right-left direction. In addition, the self-weight direction in which the gravity acts is defined as a Z-axis direction; the direction which is orthogonal to the Z-axis direction and the front-rear direction is defined as an X-axis direction; and the direction which is orthogonal to the Z-axis direction and the right-left direction is defined as a Y-axis direction. In the state in which the placement board 10 is level, the up-down direction coincides with the Z-axis direction; the front-rear direction with the Y-axis direction; and the right-left direction with the X-axis direction, respectively.

The springs 12 function as a supporting means for supporting the placement board 10 with an elastic force, being configured such that the placement board 10 is supported with the same elastic force on both sides of the oscillation central axis 16. In the first embodiment, the springs 12, which are coil-like compression springs, having the same elastic force, are disposed at the four corners of the rectangular placement board 10, respectively, and as shown in FIGS. 2A and 2B, horizontally support the placement board 10 in the state in which no detection object is placed thereon. By thus disposing the springs 12 having the same elastic force line-symmetrically about the oscillation central axis 16, the placement board 10 can be supported with the same elastic force on both sides of the oscillation central axis 16. The springs 12 are not limited to the coil-like compression springs, and leaf springs, air springs, or the like, may be used. In addition, provided that the placement board 10 can be supported with the same elastic force on both sides of the oscillation central axis 16, springs 12 having different elastic forces may be disposed on both side of the oscillation central axis 16 with the distance from the oscillation central axis 16 being varied, or the number of springs 12 which are disposed on both side of the same may be varied. Further, the placement board 10 may be configured such that, by using a single or a plurality of springs 12 (for example, a coil-like compression spring, air spring, or the like, having a large diameter) disposed on the oscillation central axis 16, the placement board 10 is supported with the same elastic force on both sides of the oscillation central axis 16. Furthermore, although it is ideal that the placement board 10 is supported with the same elastic force on both sides of the oscillation central axis 16, even in the case where the placement board 10 is supported with elastic forces slightly varying on both sides of the oscillation central axis 16, it is possible to determine the lateral rollover limit height, center-of-gravity height, and center-of-gravity location of the detection object. In the case where the elastic forces vary on the right and left sides, displacing the oscillation central axis 16 from the middle of the placement board 10 toward the side where the elastic force is stronger allows an accurate measurement to be made.

On the rear face of the placement board 10, an acceleration sensor 13 and an angular velocity sensor 14 are provided as an oscillation detection means for detecting the oscillation of the placement board 10. With the acceleration sensor 13, the sensitivity axis is adjusted such that the acceleration in the up and down (self-weight) direction (the Z-axis direction shown in FIG. 1), in other words, the vertical oscillation of the placement board 10, serving as the reference plane, in the up-down direction is detected. In addition, with the angular velocity sensor 14, the sensitivity axis is adjusted such that the angular velocity in a direction of rotation around the oscillation central axis 16, in other words, the horizontal oscillation in a direction of rotation around the oscillation central axis 16 is detected. The acceleration sensor 13 and the angular velocity sensor 14 are not particularly limited, and, for example, a crystal tuning fork type sensor or an oscillation type sensor may be used, and as the acceleration sensor 13 and the angular velocity sensor 14, a three-axis (three dimensional) angular velocity sensor may also be used.

The bottom plate 11 is provided with a pair of X-axis restriction guide parts 21 for restricting the movement of both ends of the oscillation central axis 16, respectively. In the X-axis restriction guide part 21, an elongated hole the longitudinal direction of which is in the Z-axis direction (self-weight direction) is formed, both ends of the oscillation central axis 16 being fitted into the respective elongated holes of the X-axis restriction guide parts 21 which are located in opposite positions. Thereby, the oscillation central axis 16 is moved along the elongated hole in the X-axis restriction guide part 21, and thus the placement board 10 is restricted for movement in the X-axis direction, while being allowed to make a vertical oscillation in the up-down direction, and a horizontal oscillation in the direction of rotation around the oscillation central axis 16.

In addition, in the bottom plate 11, an A-D (analog-to-digital) converter 15 is provided in a location where it will not interfere with any of the springs 12. The A-D converter 15 converts analog signals (detection results) outputted from the acceleration sensor 13 and the angular velocity sensor 14 into digital signals to output them to the data processing apparatus 3. In the case where the acceleration sensor 13 and the angular velocity sensor 14 which incorporate the A-D conversion function are used, the A-D converter 15 may be omitted.

Figure 4:
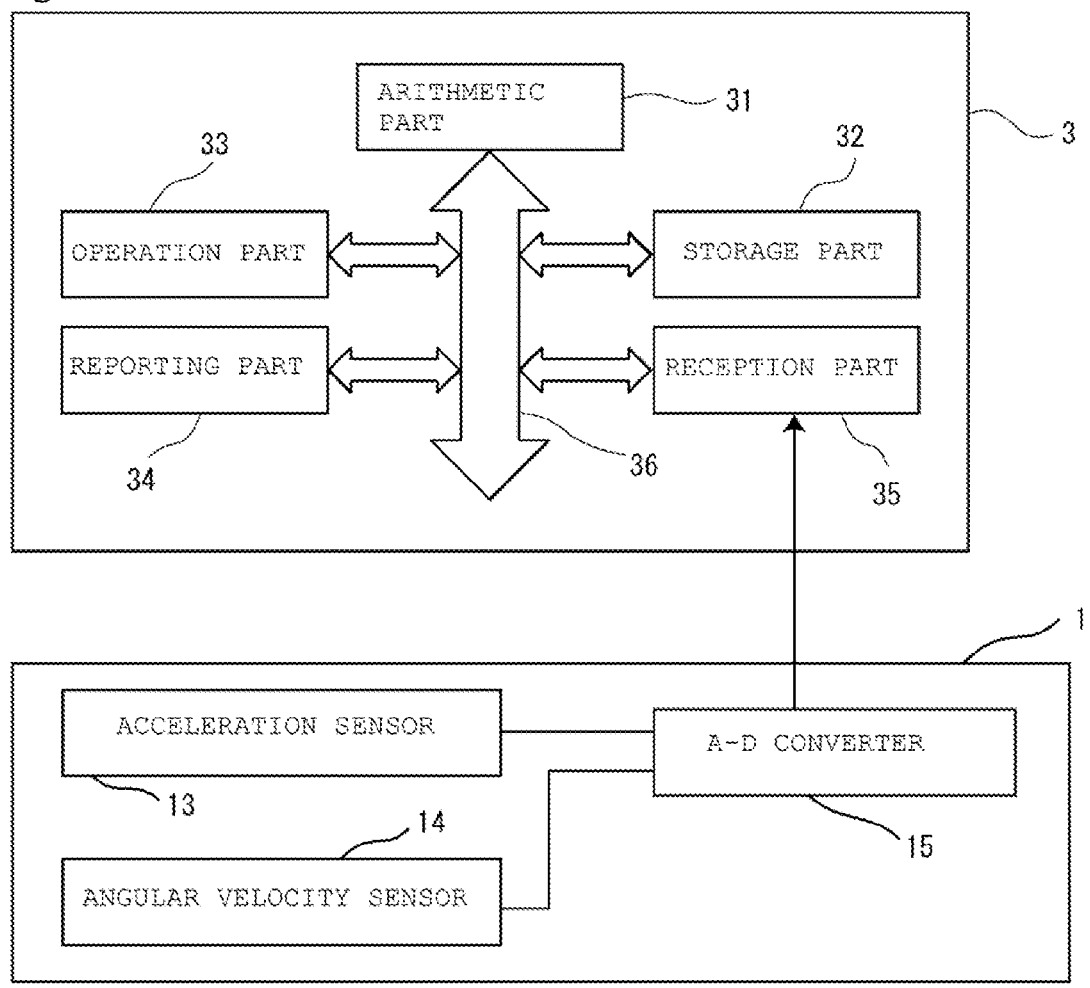
FIG. 4 is a block diagram illustrating a configuration of a data processing apparatus shown in FIG. 1.

Referring to FIG. 4, the data processing apparatus 3 includes an arithmetic part 31 comprised of a microprocessor, and the like; a storage part 32 comprised of an ROM (read-only memory), an RAM (random access memory), and the like; an operation part 33, such as a keyboard; a reporting part 34, such as a liquid crystal display or a speaker; and a reception part 35, the respective parts being connected by a bus 36.

In the storage part 32, a calculation program for deriving the center-of-gravity location, and various constants to be inputted that are required for the calculation in question are stored. The arithmetic part 31 stores the outputs from the acceleration sensor 13 and the angular velocity sensor 14 in the storage part 32 for a certain period of time on the basis of an operation instruction from the operation part 33. Next, the arithmetic part 31 performs arithmetic processing of the outputs from the acceleration sensor 13 and the angular velocity sensor 14 stored in the storage part 32 according to the calculation program stored in the storage part 32, thereby determining the lateral rollover limit height and the center-of-gravity location of the detection object that is placed on the placement board 10. The lateral rollover limit height and the center-of-gravity location of the detection object that have been determined by the arithmetic part 31 are outputted as a display notification or a voice notification from the reporting part 34.

Next, the calculation operation for the lateral rollover limit height in the first embodiment will be explained in detail with reference to FIG. 5 to FIG. 7. First, as shown in FIG. 5, the detection object 40 is placed on the placement board 10 of the oscillation detecting device 1. In the state in which the detection object 40 is placed on the placement board 10, the detection object 40 is erected at a level which depends upon the weight and center-of-gravity location of the detection object 40, being supported with the elastic force of the springs 12 which support the placement board 10. In the present invention, the weight of the detection object 40 and the spring constant of the spring 12 are optional, however, it is required that the elastic force of the spring 12 be set at an appropriate strength with respect to the weight of the detection object 40, in other words, it is not preferable that the elastic force of the spring 12 is too weak or too strong. In other words, the elastic force of the springs 12 has been set such that, in the state in which the detection object 40 is placed on the placement board 10, the detection object 40 is erected at a level which depends upon the weight and center-of-gravity location thereof, being stably stopped, and also a sufficient oscillation can be generated from such state.

Next, as shown in FIG. 5 with an arrow, the detection object is subjected to an external disturbance generating a vertical vibration and a horizontal oscillation at the same time for oscillating the detection object 40 placed on the placement board 10. The external disturbance may be caused to act on the placement board 10, or the oscillation detecting device 1 may be placed on a traveling object, such as a cart or a vehicle, to be subjected to an external disturbance produced by irregularities of the road surface.

If an external disturbance is caused to act on the detection object 40 or placement board 10 with the detection object 40 being placed on the placement board 10, the detection object 40 will make an oscillation (characteristic vibration) as shown in FIG. 5 on the basis of a motion having a natural period (frequency) which is dependent on the elastic force of the springs 12, and the total weight and the center-of-gravity location W of the detection object 40. This motion is provided in the state in which the movement in the X-axis direction is restricted by the X-axis restriction guide part 21. Therefore, the acceleration sensor 13 accurately detects the reciprocating motion of the center of gravity W of the detection object 40 in the up-down direction as a vertical oscillation in the up-down direction, while the angular velocity sensor 14 accurately detects the simple pendulum motion of the center of gravity W of the detection object 40 around the oscillation central axis 16 as a horizontal oscillation in the direction of rotation.

The detection result (the acceleration in the up-down direction) by the acceleration sensor 13 and the detection result (the angular velocity in the direction of rotation) by the angular velocity sensor 14 are inputted to the data processing apparatus 3. The arithmetic part 31 of the data processing apparatus 3 determines the vertical oscillation frequency "v" for the vertical oscillation in the up-down direction from the detection result (the acceleration in the up-down direction) by the acceleration sensor 13, while determining the horizontal oscillation frequency "V" for the horizontal oscillation in the direction of rotation around the oscillation central axis 16 from the detection result (the angular velocity in the direction of rotation) by the angular velocity sensor 14. In addition, from the detection result (the angular velocity in the direction of rotation) by the angular velocity sensor 14, the arithmetic part 31 determines the angle between the perpendicular center line passing through the oscillation central axis 16 and the rolling centerline giving the center of horizontal oscillation as an oscillation central angle "α".

The central angle "α" for the oscillation is an inclination angle "α" in a direction of rotation of the placement board 10 with respect to the horizontal plane in a standstill state (hereinafter to be referred to as an inclination angle "α" in a standstill state). Therefore, a sensor for measuring the angle of the placement board 10 in a standstill state, such as an inclination angle sensor, may be mounted to the placement board 10 for measuring the inclination angle "α" in a standstill state before the detection object 40 being oscillated. In addition, although labor and time are required, it is possible to use a level, or the like, to make a visual measurement of the inclination angle "α" in a standstill state, and input the measurement from the operation part 33 for setting. Further, a measuring means, such as a gyro, which can measure the angle of the placement board 10 may be provided for measuring the inclination angle "α" in a standstill state, or determining the central angle "α" for the oscillation from the result of measurement.

Next, the arithmetic part 31 calculates, on the basis of the vertical oscillation frequency "v" and the central angle "α" which have been determined, a lateral rollover limit height $l_{max}$, which indicates the limit of center-of-gravity height beyond which the detection object 40 comes to a lateral rollover in a right-left direction, while, on the basis of the vertical oscillation frequency "v", the horizontal oscillation frequency "V", and the central angle "α" which have been determined, calculating a center-of-gravity height in the up-down direction, "l", from the oscillation central axis 16 to the center of gravity W of the detection object 40, and a center-of-gravity distance in the right-left direction, "s", from the oscillation central axis 16 to the center of gravity W of the detection object 40.

First, the calculation method for the lateral rollover limit height $l_{max}$ will be explained. The horizontal oscillation in a direction of rotation is a simple pendulum motion in a right-left direction around the oscillation central axis 16. Therefore, from the balance expression of rotation moment, the force in a direction of rotation, "f", acting on the center of gravity W of the detection object 40 can be expressed by the following equation:

$$f = -\frac{mg}{\sqrt{l^2+s^2}\cos\alpha}\left(\frac{kb^2}{2\,mg} - l\right)\sin\theta,\qquad \text{[Math 1]}$$

In [Math 1], the symbol "m" denotes the weight of the detection object 40; "g" the gravitational acceleration; "k" the modulus of elasticity (spring constant) of the spring 12; and "b" the distance between the springs 12 on both sides of the oscillation central axis 16. In addition, the symbol "θ'" denotes an angle in a direction of rotation of the detection object 40 with respect to the plane which is inclined in the direction of rotation by the central angle "α" from the horizontal plane, and the angle "θ'" changes with time along with the horizontal oscillation in the direction of rotation. The modulus of elasticity, "k", which is used here is that which is given when all the springs 12 disposed on both right and left sides of the oscillation central axis 16 are considered as a single spring.

Here is a discussion about the case where the center of gravity W of the detection object 40 is on the perpendicular center line as shown in FIG. 6A. In the case where the center of gravity W of the detection object 40 is on the perpendicular center line, "s" is equal to 0 and the central angle "α" is equal to 0. Therefore, if the height of the center of gravity W in this state is defined as "$l_0$", [Math 1] can be expressed by the following equation:

$$f = -\frac{mg}{l_0}\left(\frac{kb^2}{2\,mg} - l_0\right)\sin\theta\qquad \text{[Math 2]}$$

In [Math 2], the symbol "θ" denotes an angle in a direction of rotation of the detection object 40 with respect to the horizontal plane, and the angle "θ" changes with time along with the horizontal oscillation in the direction of rotation.

In [Math 2], in order for the force in the direction of rotation, "f", acting on the center of gravity W to provide a righting moment against the gravity, the following inequality must be met.

$$\frac{kb^2}{2\,mg} - l_0 > 0 \qquad \text{[Math 3]}$$

In other words, if [Math 3] is not met, the force in the direction of rotation, "f", acting on the center of gravity W providing a righting moment against the gravity cannot be obtained, resulting in the detection object 40 coming to a lateral rollover. Therefore, if the limit of center-of-gravity height beyond which the detection object 40 comes to a lateral rollover is defined as the lateral rollover limit height $l_{0max}$, the lateral rollover limit height $l_{0max}$ can be expressed by the following equation:

$$l_{0max} = \frac{kb^2}{2\,mg} \qquad \text{[Math 4]}$$

In addition, the value of "k"/"m" can be expressed by the following equation, using the vertical oscillation frequency "v" for the vertical oscillation in the up-down direction. The symbol "π" denotes the circular constant.

$$\frac{k}{m} = 2\pi^2 v^2 \quad \text{[Math 5]}$$

Therefore, the lateral rollover limit height $l_{0max}$ can be expressed by the following equation, using the vertical oscillation frequency "v" for the vertical oscillation in the up-down direction and the distance "b" between the springs 12 on both sides of the oscillation central axis 16, and with the "b" being set, measuring the vertical oscillation frequency "v" for the vertical oscillation, the lateral rollover limit height $l_{0max}$ can be determined.

$$l_{0max} = \frac{\pi^2 v^2 b^2}{g} \quad \text{[Math 6]}$$

In reality, the center of gravity W is not always on the perpendicular center line, existing at an arbitrary location, and thus it is necessary to indicate not only the lateral rollover limit height $l_{0max}$ on the perpendicular center line, but also the lateral rollover limit location in the right-left direction.

Figure 6B:
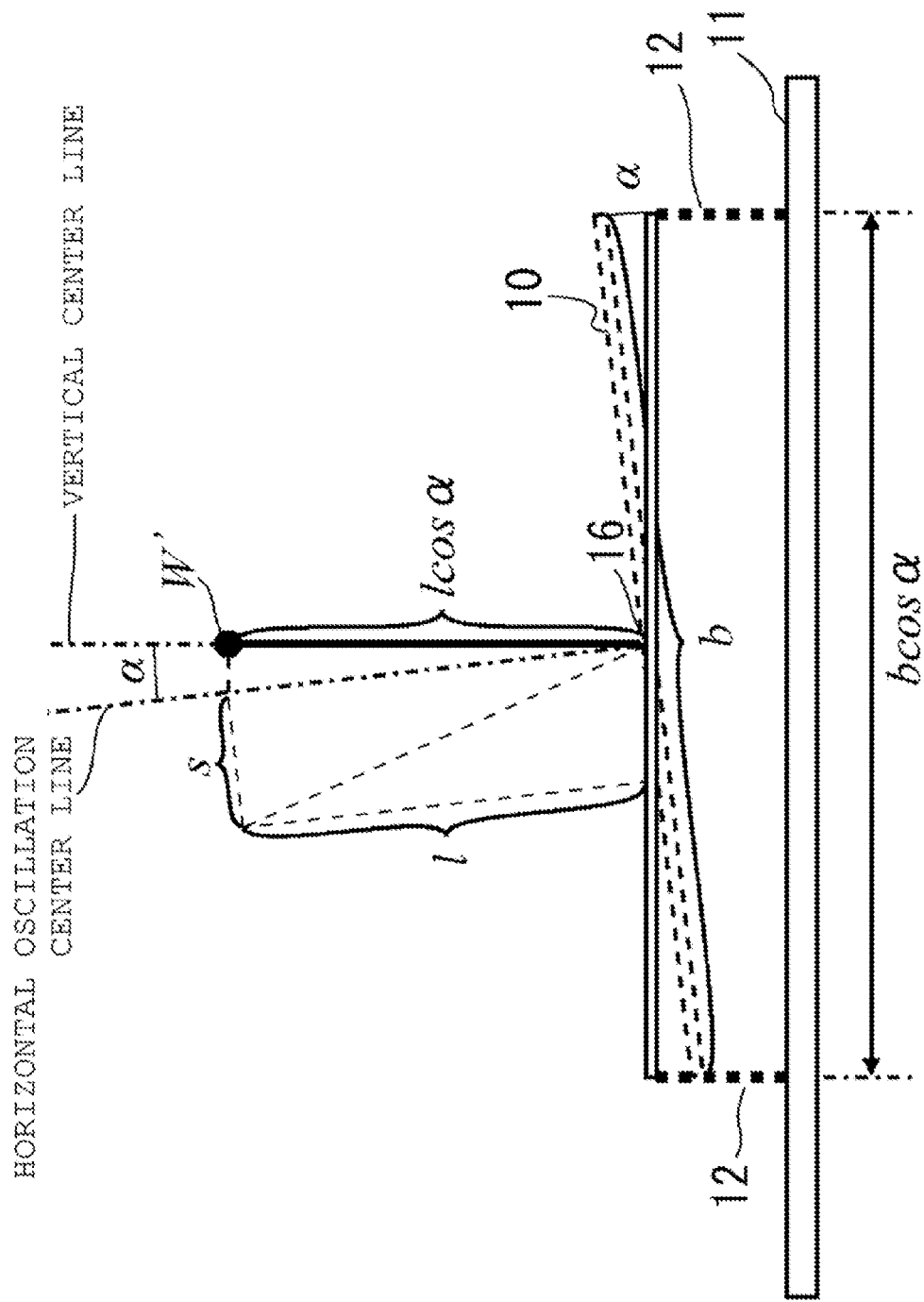

As shown in FIG. 5, in the state in which the horizontal oscillation center line is inclined from the perpendicular center line by the central angle "α", considering the components in the vertical line direction and the horizontal position direction gives l cos α as the length "l" in the vertical line direction, and likewise b cos α as the length "b" in the horizontal direction. Therefore, the state shown in FIG. 5 can be replaced with a phenomenon in which, as shown in FIG. 6B, the center of gravity W' existing on the vertical line with a height of l cos α is oscillating on a spring structure with a width of b cos α. If the state shown in FIG. 6B is expressed by using [Math 2] and [Math 6], the following equation is given.

$$f = -\frac{mg}{l\cos\alpha}\left(\frac{kb^2\cos^2\alpha}{2\,mg} - l\cos\alpha\right)\sin\theta \quad \text{[Math 7]}$$
$$= -\frac{mg}{l\cos\alpha}(l_{0max}\cos 2\alpha - l\cos\alpha)\sin\theta$$

In [Math 7], in order for the force in the direction of rotation, "f", acting on the center of gravity W to provide a righting moment against the gravity, the following inequality must be met.

$$l_{0max}\cos 2\alpha - l\cos\alpha > 0 \quad \text{[Math 8]}$$

In other words, in the case where the center-of-gravity distance in the right-left direction, "s", is not zero, if [Math 8] is not met, the force in the direction of rotation, "f", acting on the center of gravity W providing a righting moment against the gravity cannot be obtained, resulting in the detection object 40 coming to a lateral rollover. Therefore, in the case where the center-of-gravity distance in the right-left direction, "s", is not zero, if the limit of center-of-gravity height beyond which the detection object 40 comes to a lateral rollover is defined as the lateral rollover limit height $l_{max}$, the lateral rollover limit height $l_{max}$ can be expressed by the following equation:

$$l_{max} = l_{0max}\cos\alpha \quad \text{[Math 9]}$$

Therefore, the lateral rollover limit height $l_{max}$ in the case where the center-of-gravity distance in the right-left direction, "s", is not zero can be determined from the lateral rollover limit height $l_{0max}$ which has been determined by using [Math 6], and the central angle "α" between the perpendicular center line and the horizontal oscillation center line. According to [Math 9], the lateral rollover limit height $l_{max}$ is always a value smaller than the lateral rollover limit height $l_{0max}$, and it can be seen that the larger the central angle "α", in other words, the more distant from the perpendicular center line the center-of-gravity location in the right-left direction is, the smaller the value of the lateral rollover limit height $l_{max}$ will be.

Next, the calculation method for the center-of-gravity height in the up-down direction, "l", and the center-of-gravity distance in the right-left direction, "s", will be explained. The center-of-gravity height in the up-down direction, "l", and the center-of-gravity distance in the right-left direction, "s", can be expressed by the following equation, using the vertical oscillation frequency "v" and the horizontal oscillation frequency "V" which can be determined from the detection results by the acceleration sensor 13 and the angular velocity sensor 14, and the central angle "α".

$$l^2 + s^2 = \frac{b^2\pi^2 v^2 - gl}{4\pi^2 V^2 \cos\alpha} \quad \text{[Math 10]}$$

In addition, the center-of-gravity distance in the right-left direction, "s", can be expressed by the following equation, using the center-of-gravity height in the up-down direction, "l", and the vertical oscillation frequency "v" which is determined from the detection result by the acceleration sensor 13, and the central angle "α".

$$s = \left(\frac{\pi^2 v^2 b^2}{g} - l\right)\tan\alpha \quad \text{[Math 11]}$$

Further, by substituting [Math 11] for [Math 10], a quadratic equation based on the center-of-gravity height in the up-down direction, "l", is obtained as expressed by the following equation.

$$(l + \tan^2\alpha)l^2 + \left(\frac{g}{4\pi^2 V\cos\alpha} - \frac{2\pi^2 v^2 b^2}{g}\tan\alpha\right)l + \frac{\pi^4 v^4 b^4}{g}\tan^2\alpha - \frac{b^2 v^2}{4V^2\cos\alpha} = 0 \quad \text{[Math 12]}$$

In [Math 12], the quadratic coefficient, the linear coefficient, and the constant terms can be defined using the vertical oscillation frequency "v", the horizontal oscillation frequency "V", and the central angle α which have been determined. Therefore, the data processing apparatus 3 determines the center-of-gravity height in the up-down direction, "l", by operating [Math 3] with the vertical oscillation frequency "v", the horizontal oscillation frequency "V", and the central angle α which have been determined, and further, determines the center-of-gravity distance in the right-left direction, "s", by operating [Math 2]. Since the center-of-gravity height in the up-down direction, "l", is a height from the oscillation central axis 16 to the center of gravity W of the detection object 40 in the up-down direction, it is recommended that, in the case where the thickness of the placement board 10 or the radius of the oscillation central axis 16 is of a value which cannot be neglected, the result of subtraction of the value be determined as a center-of-gravity height in the up-down direction, "l".

The lateral rollover limit height $l_{max}$, the center-of-gravity height in the up-down direction, "l", and the center-of-gravity distance in the right-left direction, "s", which have been determined by the arithmetic part 31 are outputted by the reporting part 34. The reporting part 34 causes a reporting screen 50 as shown in FIG. 7, for example, in the reporting part 34 for reporting the lateral rollover limit height $l_{max}$ the center-of-gravity height in the up-down direction, "l", and the center-of-gravity distance in the right-left direction, "s". On the reporting screen 50, a graph 51 which represents the up-down direction by the vertical axis, and the right-left direction by the horizontal axis is provided such that the lateral rollover limit height $l_{max}$ the center-of-gravity height in the up-down direction, "l", and the center-of-gravity distance in the right-left direction, "s", are outputted, being graphed. In the graph 51, the mark "x" denotes the lateral rollover limit height $l_{max}$, and the mark "•" the center-of-gravity height in the up-down direction, "l", and the center-of-gravity distance in the right-left direction, "s", respectively. Further, the dotted line in the graph 51 provides a prediction curve for the lateral rollover limit height $l_{max}$ according to the center-of-gravity distance in the right-left direction, "s", allowing grasping of the limit of the center-of-gravity distance in the right-left direction, "s", beyond which overturning is caused. Thereby, the user can simply recognize the lateral rollover limit height $l_{max}$, the center-of-gravity height in the up-down direction, "l", and the center-of-gravity distance in the right-left direction, "s", in a visual manner. In addition, in the reporting screen 50, a display column for displaying the vertical oscillation frequency "v", the horizontal oscillation frequency "V", and the central angle "α" which have been determined, and an input column for allowing inputting the distance "b" between the springs 12 on both sides of the oscillation central axis 16, the conditions for the FFT, and the like, may be provided.

As described above, in the first embodiment, the oscillation detecting device 1 (the placement board 10 and the springs 12) and the detection object 40 placed on the placement board 10 are provided as a structure in which the reference plane (placement board 10) is supported with the elastic force (springs 12) on both sides of the reference axis (oscillation central axis 16), respectively, with the acceleration sensor 13 for detecting the reciprocating motion in the up-down direction of the reference plane (placement board 10), and the arithmetic part 31 which, on the basis of the inclination angle "α" of the reference plane (placement board 10) in a direction of rotation around the reference axis (oscillation central axis 16) with respect to the horizontal plane in a standstill state of the detection object 40 and the detection result by the acceleration sensor 13, calculates a limit center-of-gravity height beyond which the detection object 40 placed on the placement board 10 is rolled over in the direction of rotation as a lateral rollover limit height $l_{max}$ for a center-of-gravity location on the reference plane (placement board 10) of the structure (detection object 40) being provided. With this configuration, in the first embodiment, there is provided an advantage that, even in a structure for which the weight or the weight distribution has not been clarified in advance, the lateral rollover limit height $l_{max}$ can be calculated, and on the basis of the lateral rollover limit height $l_{max}$ which has been calculated, the danger of lateral rollover of the structure for which the weight or the weight distribution has not been clarified in advance can be determined. For example, by using an oscillation detecting device 1 and a detection object 40 which simulate various vehicles, and changing the center-of-gravity height/location of the detection object 40 for calculating the lateral rollover limit height $l_{max}$, respectively, the danger of lateral rollover in various situations can be simulated.

Further, in the first embodiment, the arithmetic part 31 is configured so as to calculate a center-of-gravity height beyond which the force in the direction of rotation acting on the center of gravity W of the structure (detection object 40) resulting from the elastic force (springs 12) cannot provide a righting moment against the gravity, as a lateral rollover limit height $l_{max}$. With this configuration, in the first embodiment, even in a structure for which the weight or weight distribution has not been clarified in advance, the lateral rollover limit height $l_{max}$ can be calculated by using a simple calculation formula on the basis of the detection result by the acceleration sensor 13.

Further, in the first embodiment, there is provided the angular velocity sensor 14 for detecting the turning around the reference axis (oscillation central axis 16) of the reference plane (placement board 10), and the arithmetic part 31 is configured so as to determine, from the detection result by the angular velocity sensor 14, the central angle "α" for the oscillation around the reference axis (oscillation central axis 16) as an inclination angle "α" in a standstill state. In addition, the arithmetic part 31 is configured so as to determine, from the detection result by the acceleration sensor 13, the vertical oscillation frequency "v" in the up-down direction for the reference plane (placement board 10), and on the basis of the vertical oscillation frequency "v" and the central angle "α" for the oscillation, calculate the lateral rollover limit height $l_{max}$. With this configuration, in the first embodiment, the inclination angle in a standstill state can be determined in an oscillating state, and the lateral rollover limit height $l_{max}$ can be calculated in the oscillating state.

Further, in the first embodiment, the arithmetic part 31 is configured so as to calculate the center-of-gravity height from the reference axis (oscillation central axis 16) in the up-down direction to the center of gravity W of the detection object 40 on the basis of the detection results by the acceleration sensor 13 and the angular velocity sensor 14. With this configuration, in the first embodiment, there is provided an advantage that, on the basis of the lateral rollover limit height $l_{max}$ and the center-of-gravity height, the danger of lateral rollover of the structure can be determined.

(Second Embodiment)

The lateral rollover limit detection system of the present invention can be loaded on traveling vehicles, such as various trucks, various buses, and various passenger cars. In the second embodiment, the lateral rollover limit detection system of the present invention is loaded on a trailer truck 60 for towing a container as a truck.

Figure 9:
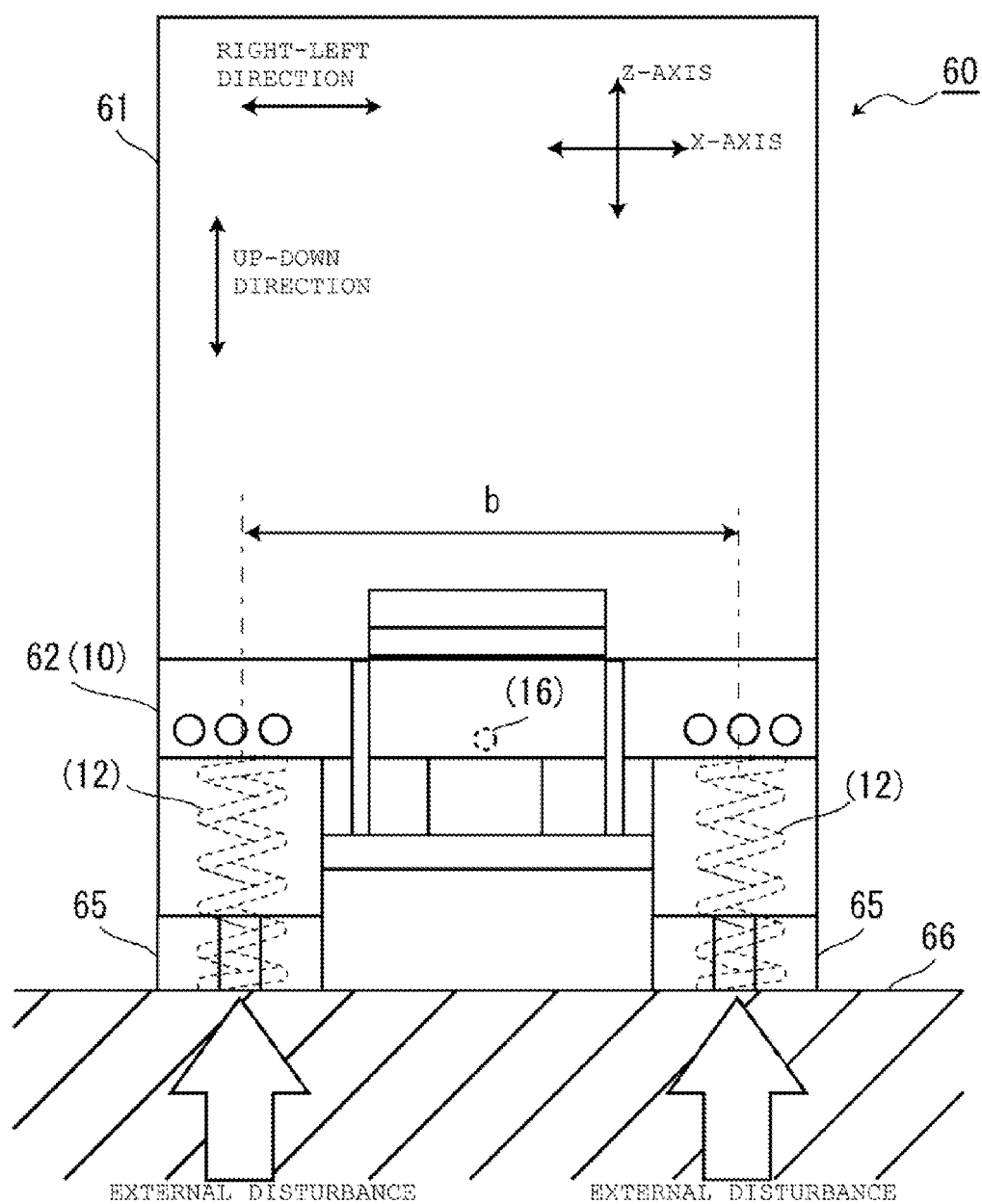
FIG. 9 is a rear view showing a configuration of a trailer truck on which there is loaded the lateral rollover limit detection system according to the second embodiment of the present invention.

Referring to FIG. 8 and FIG. 9, the trailer truck 60 includes a container 61, a container chassis 63 as a cart including a load-carrying platform 62 on which the container 61 is loaded, and a tractor (traction vehicle) 64 to be connected to the container chassis 63 for towing or driving the container chassis 63. As shown in FIG. 8, in the state in which the container 61 is loaded on the container chassis 63, the vehicle weight of the trailer truck 60 including the container 61 is supported with the elastic force for buffering that is given by tires 65 of the tractor 64 and the container chassis 63, and a suspension (not shown), the trailer truck 60 being erected at a fixed level from a road surface 66. When the trailer truck is traveled, the tires 65 continue to tread on the irregularities of the road surface 66, thereby a random external disturbance being transmitted to the vehicle body of the trailer truck 60 through the tires 65 and the suspension (not shown).

In the second embodiment, as shown in FIG. 8 and FIG. 9, the direction perpendicular to the placement plane of the load-carrying platform 62 is defined as an up-down direction, the direction along the longitudinal width of the trailer truck 60 as a front-back direction, and the direction along the crosswise width of the trailer truck 60 as a right-left direction. In addition, the self-weight direction in which the gravity acts is defined as a Z-axis direction; the direction which is orthogonal to the Z-axis direction and the front-rear direction as an X-axis direction; and the direction which is orthogonal to the Z-axis direction and the right-left direction as a Y-axis direction. In the state in which the load-carrying platform 62 is level, the up-down direction coincides with the Z-axis direction; the front-rear direction with the Y-axis direction; and the right-left direction with the X-axis direction, respectively.

The lateral rollover limit detection system in the second embodiment includes an oscillation detector 70 for detecting the oscillation of the trailer truck 60, and a data processing apparatus 3a, the oscillation detector 70 being disposed in the middle of the crosswise width of the tractor 64, and the data processing apparatus 3a being disposed in the cabin of the tractor 64. The trailer truck 60 is configured such that the container chassis 63 and the tractor 64 can be disconnected, and thus for convenience' sake, it is configured such that the oscillation detector 70 is disposed in the tractor 64, however, in order to accurately detect the oscillation of the load-carrying platform 62 on which the cargo is loaded, it is desirable to dispose the oscillation detector 70 on the load-carrying platform 62.

Figure 10:
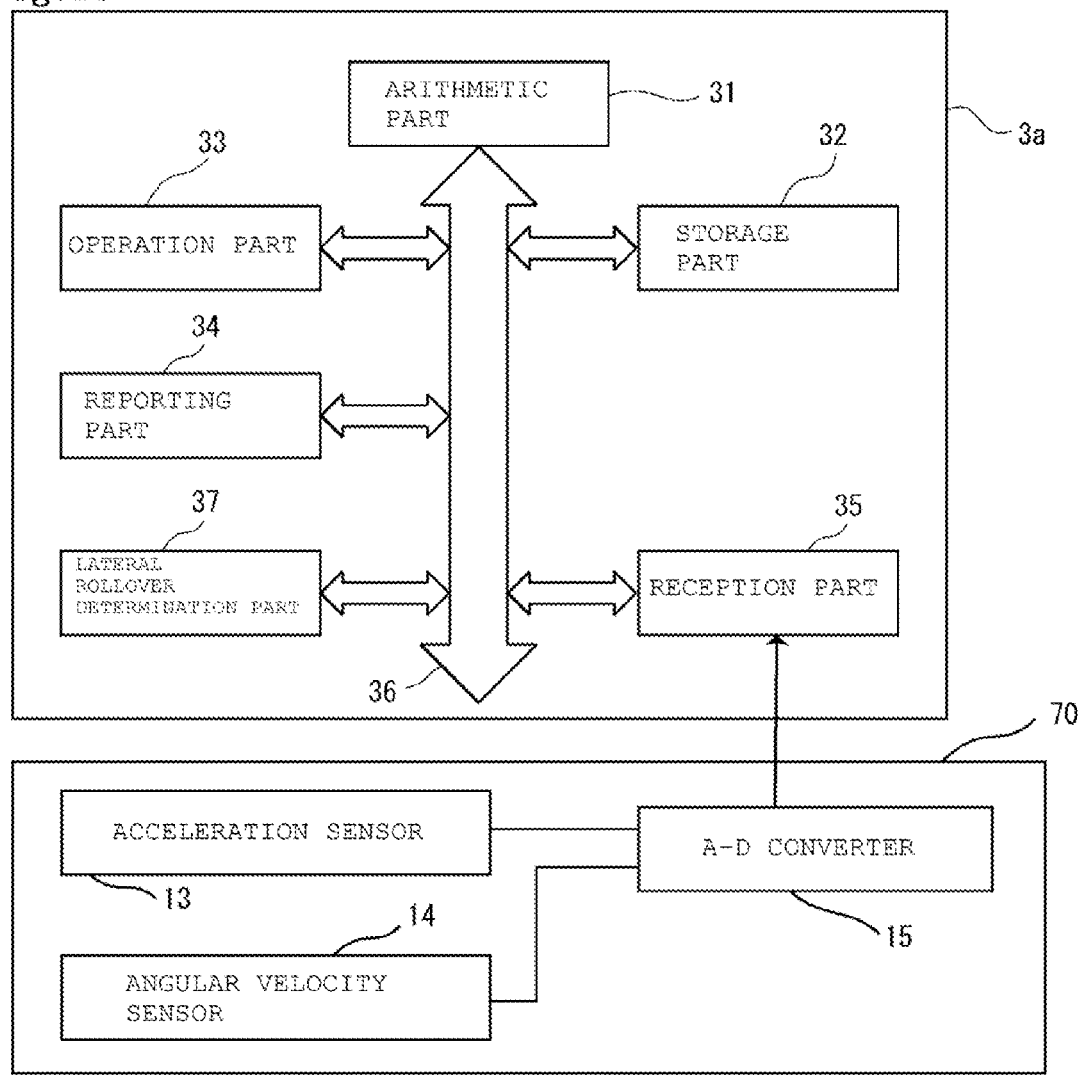
FIG. 10 is a block diagram illustrating a configuration of the lateral rollover limit detection system according to the second embodiment of the present invention.

Referring to FIG. 10, the oscillation detector 70 includes an acceleration sensor 13, an angular velocity sensor 14, and an A-D converter 15. The same component as that in the first embodiment will be provided with the same sign, the explanation thereof being omitted. In addition, the oscillation detector 70 is a component corresponding to the oscillation detecting device 1 in the first embodiment, and on the assumption that the placement board 10, the springs 12, and the oscillation central axis 16 of the oscillation detecting device 1 correspond to the load-carrying platform 62 of the container chassis 63, the elastic force for buffering that is given by the tires 65 and the suspension (not shown), and the vehicle longitudinal axis of the trailer truck 60 (container chassis 63), respectively, the oscillation of the trailer truck 60 is detected.

The data processing apparatus 3a includes an arithmetic part 31, a storage part 32, an operation part 33, a reporting part 34, a reception part 35, and a lateral rollover determination part 37 for determining the necessity for lateral rollover warning, and the respective parts are connected to one another with a bus 36.

The detection result (the acceleration in the up-down direction) by the acceleration sensor 13 of the oscillation detector 70 and the detection result (the angular velocity in the direction of rotation) by the angular velocity sensor 14 of the same are inputted to the data processing apparatus 3a. As in the first embodiment, the arithmetic part 31 of the data processing apparatus 3a calculates, on the basis of the vertical oscillation frequency "v" and the central angle "α", a lateral rollover limit height $l_{max}$ beyond which a lateral rollover in the right-left is caused, while, on the basis of the vertical oscillation frequency "v", the horizontal oscillation frequency "V", and the central angle "α", calculating a center-of-gravity height in the up-down direction, "l", from the vehicle longitudinal axis to the center of gravity W, and a center-of-gravity distance in the right-left direction, "s", from the vehicle longitudinal axis to the center of gravity W.

The detection result by the acceleration sensor 13 (the acceleration in the up-down direction) and the detection result by the angular velocity sensor 14 (the angular velocity in the direction of rotation) are always inputted to the data processing apparatus 3a, and the arithmetic part 31 of the data processing apparatus 3a calculates a lateral rollover limit height $l_{max}$ a center-of-gravity height "l", and a center-of-gravity distance "s" every fixed period during traveling. Therefore, the lateral rollover limit height $l_{max}$, the center-of-gravity height in the up-down direction, "l", and the center-of-gravity distance in the right-left direction, "s", are updated in real time at any time. The lateral rollover limit height $l_{max}$ in the past, and the changes in center-of-gravity height in the up-down direction, "l", and center-of-gravity distance in the right-left direction, "s", may be recorded in the storage part 32. In this case, by verifying the change in lateral rollover limit height $l_{max}$, or the changes in center-of-gravity height in the up-down direction, "l", and center-of-gravity distance in the right-left direction, "s", the cause of a lateral rollover accident, or the like, can be analyzed.

The lateral rollover determination part 37 monitors the difference between the lateral rollover limit height $l_{max}$ and the center-of-gravity height in the up-down direction, "l", which have been calculated by the arithmetic part 31, determining whether there is the danger of lateral rollover or not, and when the degree of lateral rollover danger is increased, in other words, the difference between the lateral rollover limit height $l_{max}$ and the center-of-gravity height in the up-down direction, "l", is decreased to under a predetermined lateral rollover determination threshold value, the lateral rollover determination part 37 causes the reporting part 34 to output a lateral rollover warning.

Figure 11:
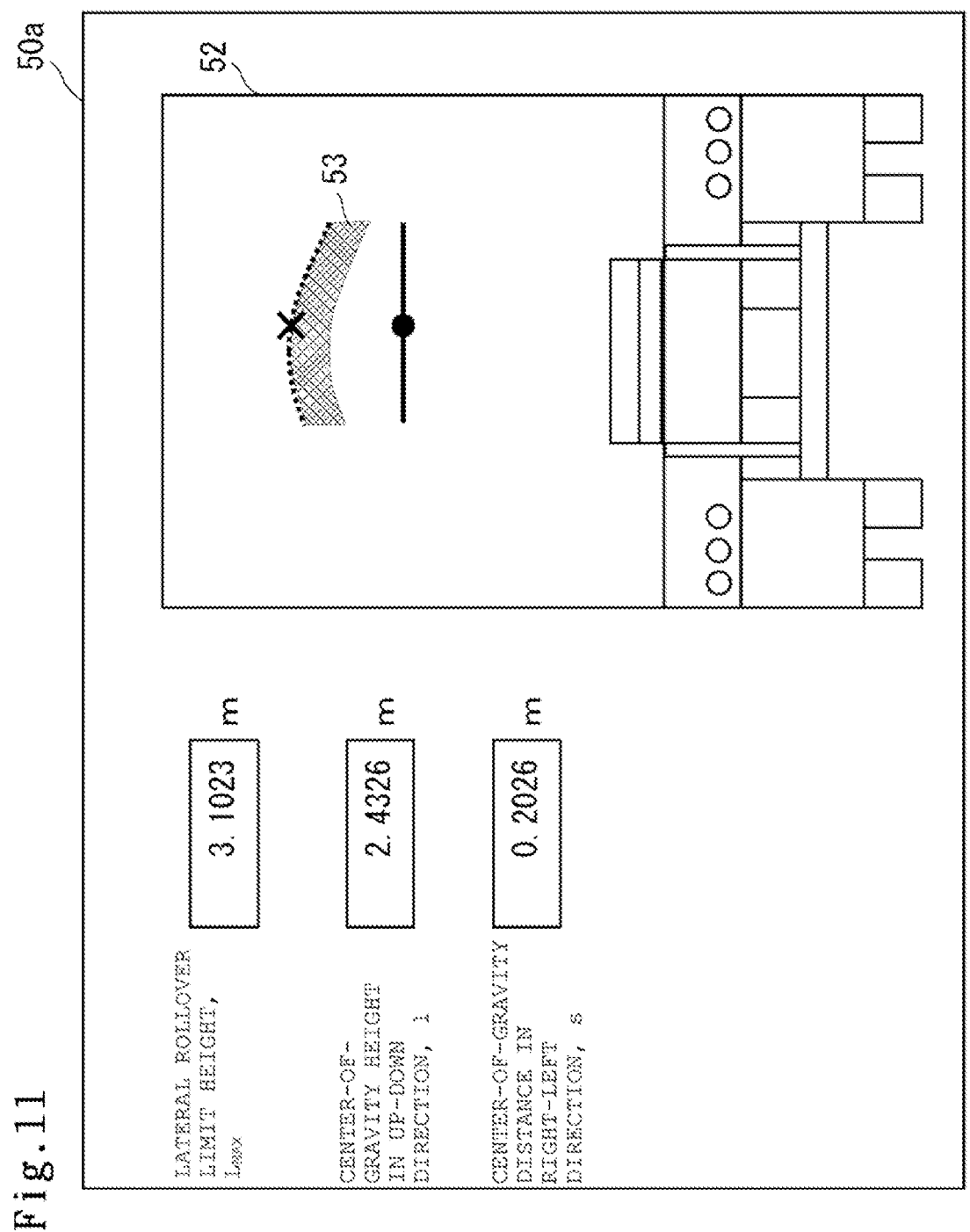
FIG. 11 is a figure giving an example of reporting screen outputted to a reporting part shown in FIG. 10.

The lateral rollover limit height $l_{max}$ the center-of-gravity height in the up-down direction, "l", and the center-of-gravity distance in the right-left direction, "s", which have been determined by the arithmetic part 31 are outputted by the reporting part 34. The reporting part 34 displays a reporting screen 50a as shown in, for example, FIG. 11, for reporting the lateral rollover limit height $l_{max}$, the center-of-gravity height in the up-down direction, "l", and the center-of-gravity distance in the right-left direction, "s", which are updated in real time at any time. Thereby, cargo collapse or shift during traveling can be detected in real time. On the reporting screen 50a, there is provided an illustration 52 of the trailer truck 60 when viewed from the rear side, with the lateral rollover limit height $l_{max}$, the center-of-gravity height in the up-down direction, "l", and the center-of-gravity distance in the right-left direction, "s", being outputted onto the illustration 52. In the illustration 52, the mark "x" denotes the current lateral rollover limit height $l_{max}$, and the mark "•" the current center-of-gravity height in the up-down direction, "l", and the current center-of-gravity distance in the right-left direction, "s", respectively. Further, the dotted line in the illustration 52 indicates the change in lateral rollover limit height $l_{max}$, while the solid line the changes in center-of-gravity height in the up-down direction, "l", and center-of-gravity distance in the right-left direction, "s". Further, the shaded area 53 in the illustration 52 indicates the range in which the lateral rollover determination part 37 outputs a lateral rollover warning (the range of the lateral rollover determination threshold value). Thereby, the driver can visually grasp the lateral rollover limit height $l_{max}$, the center-of-gravity height in the up-down direction, "l", and the center-of-gravity distance in the right-left direction, "s", to easily recognize the lateral rollover danger. Specifically, the driver can understand that, if the difference between the center-of-gravity height in the up-down direction, "l", and the lateral rollover limit height $l_{max}$ has been already in the state in which there is no margin (the state in which the difference is close to zero), the steering wheel should not be turned without the speed being sufficiently lowered. In addition, even if the difference between the center-of-gravity height in the up-down direction, "l", and the lateral rollover limit height $l_{max}$ has a margin, it can be visually judged that, once the steering wheel is started to be turned, the difference is abruptly reduced, and thus, the driver can determine, at the stage of getting into a curving road, whether or not he/she will fall into a dangerous state thereafter.

As described above, in the second embodiment, the trailer truck 60 is provided as a structure in which the load-carrying platform 62 is supported with the elastic force (the tires 65, the suspension (not shown), and the like) on both sides of the vehicle longitudinal axis, respectively, with the acceleration sensor 13 for detecting the reciprocating motion in the up-down direction of the load-carrying platform 62, the angular velocity sensor 14 for detecting a simple pendulum motion in a direction of rotation around the vehicle longitudinal axis, and the arithmetic part 31 which, on the basis of the detection results by the acceleration sensor 13 and the angular velocity sensor 14, calculates a limit center-of-gravity height beyond which the trailer truck 60 is rolled over in the direction of rotation as a lateral rollover limit height $l_{max}$ for a center-of-gravity location on the load-carrying platform 62 of the trailer truck 60 being provided. With this configuration, in the first embodiment, there is provided an advantage that, in a traveling vehicle, such as the trailer truck 60, the lateral rollover limit height $l_{max}$ can be calculated during traveling, and on the basis of the lateral rollover limit height $l_{max}$ which has been calculated, the danger of lateral rollover of the traveling vehicle during traveling can be determined. Also for a traveling vehicle, such as a passenger car, which does not have a load-carrying platform 62, by assuming the chassis, or the like, to be the reference plane, the lateral rollover limit height $l_{max}$ can be calculated, and the danger of lateral rollover of the traveling vehicle during traveling can be determined in the same manner. In addition, on the change in lateral rollover limit height $l_{max}$, an abnormal air pressure of the tire 65, a deterioration of the suspension, and the like, can be detected.

Further, in the second embodiment, the arithmetic part 31 is configured so as to calculate the center-of-gravity height from the reference axis (oscillation central axis 16) in the up-down direction to the center of gravity W of the detection object 40 on the basis of the detection results by the acceleration sensor 13 and the angular velocity sensor 14. In addition, in the second embodiment, there are provided the lateral rollover determination part 37 for determining the lateral rollover danger in the direction of rotation of the structure (detection object 40) on the basis of the lateral rollover limit height $l_{max}$ and the center-of-gravity height which have been calculated, and the reporting part 34 for reporting the result of determination by the lateral rollover determination part 37. With this configuration, in the second embodiment, there is provided an advantage that, on the basis of the lateral rollover limit height $l_{max}$ and the center-of-gravity height, the danger of lateral rollover of a structure can be determined.

(Third Embodiment)

The lateral rollover limit detection system of the present invention can be loaded on a mobile or stationary crane.

In the third embodiment, the oscillation detector 70 and the data processing apparatus 3a in the second embodiment are loaded on a crane vehicle 80, which is a mobile crane.

Figure 12:
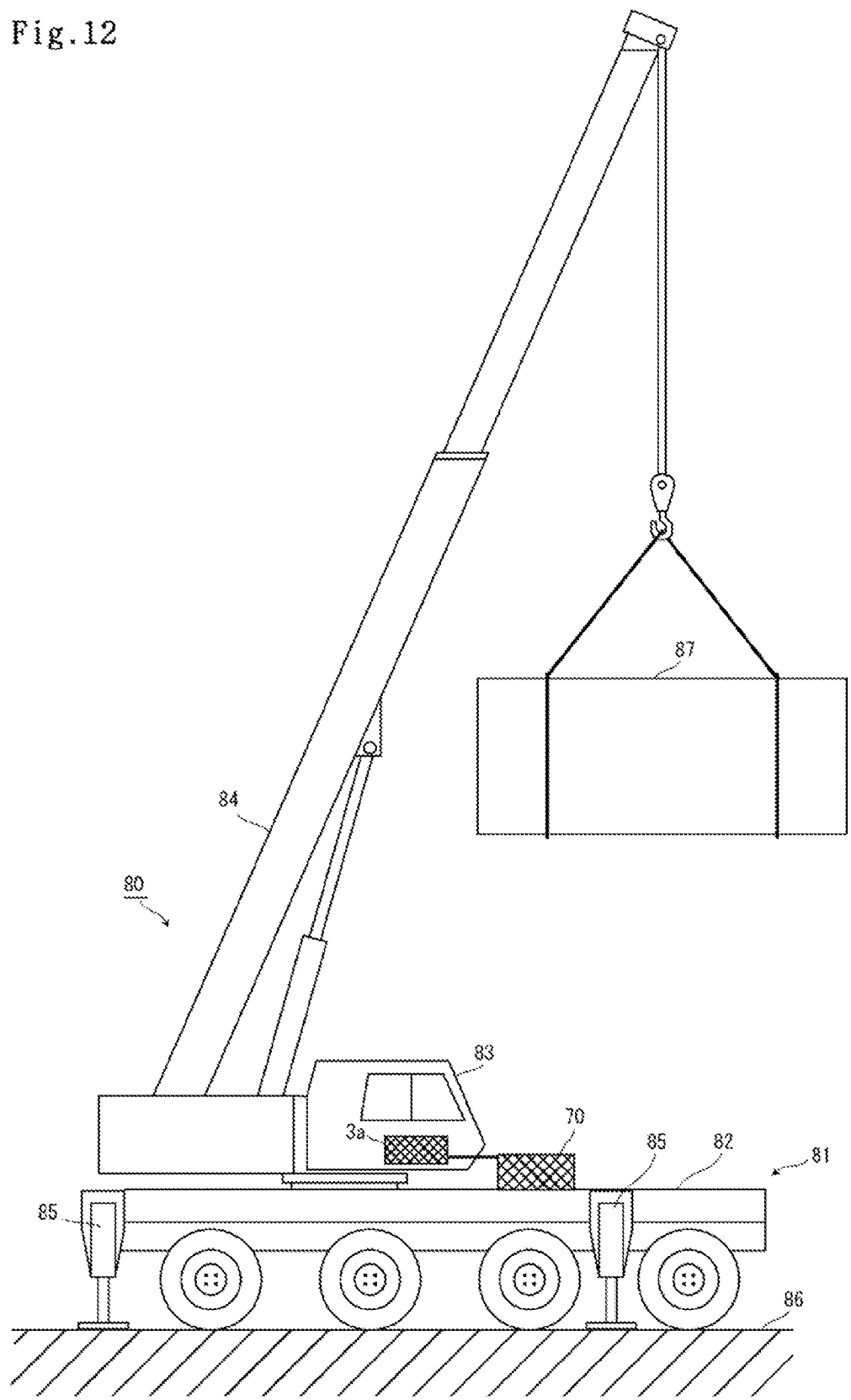
FIG. 12 is a side view showing a configuration of a crane vehicle on which there is loaded a lateral rollover limit detection system according to a third embodiment of the present invention.
Figure 13:
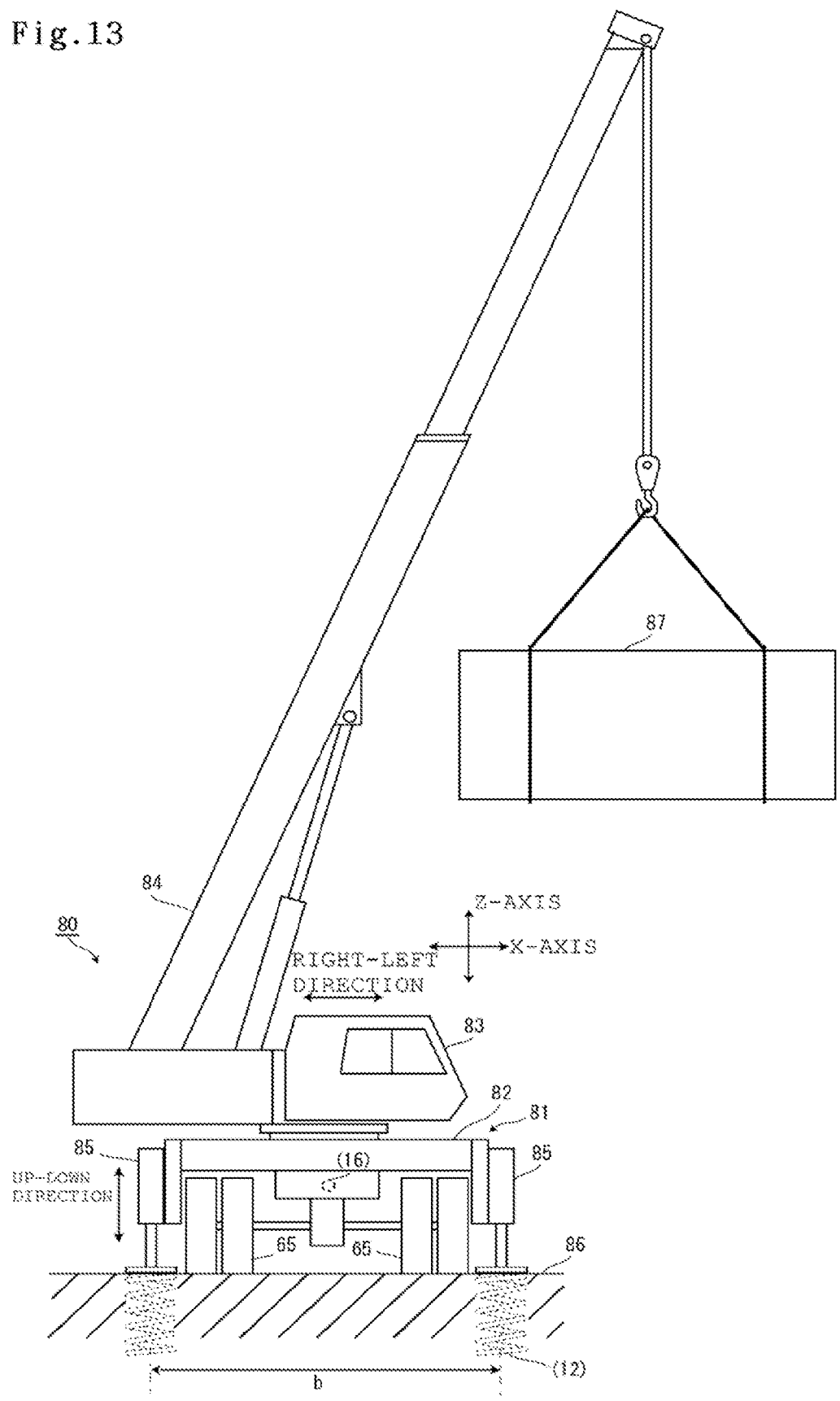
FIG. 13 is a rear view showing a configuration of a crane vehicle on which there is loaded the lateral rollover limit detection system according to the third embodiment of the present invention.

Referring to FIG. 12 and FIG. 13, the crane vehicle 80 includes a vehicle 81, a swivel base 83 which is swivelably mounted on a mounting surface 82 of the vehicle 81, and a telescoping boom 84 which is telescopically and elevatably disposed on the swivel base 83. In addition, the vehicle 81 is provided with outriggers 85, and the crane work is performed with the outriggers 85 being projected from the sides of the vehicle body to be contacted with the ground 86 for stabilizing the vehicle 81.

In the third embodiment, as shown in FIG. 12 and FIG. 13, the direction perpendicular to the placement plane of the mounting surface 82 is defined as an up-down direction, the direction along the longitudinal width of the crane vehicle 80 as a front-back direction, and the direction along the crosswise width of the crane vehicle 80 as a right-left direction. In addition, the self-weight direction in which the gravity acts is defined as a Z-axis direction; the direction which is orthogonal to the Z-axis direction and the front-rear direction as an X-axis direction; and the direction which is orthogonal to the Z-axis direction and the right-left direction as a Y-axis direction. In the state in which the mounting surface 82 is level, the up-down direction coincides with the Z-axis direction; the front-rear direction with the Y-axis direction; and the right-left direction with the X-axis direction, respectively.

Although a hoisted cargo 87, such as a construction material, is lighter than the operating load weight allowable for the crane vehicle 80, the crane vehicle 80 may come to a lateral rollover during a rise while suspending. Such a lateral rollover accident often occurs in the case where the crane work is being performed on a ground 86 which is a soft ground. In the case where the ground 86 is a soft ground, the vibration of the engine or the cargo lifting appliance of the crane vehicle 80 is transmitted to the soft ground, which forms a spring structure with the crane vehicle 80, resulting in the ground 86 being vibrated. It is considered that such vibration of the ground 86 induces a natural vibration of the crane vehicle 80, leading to a lateral rollover accident.

Then, in the third embodiment, on the assumption that the placement board 10, the springs 12, and the oscillation central axis 16 of the oscillation detecting device 1 in the first embodiment correspond to the mounting surface 82 of the vehicle 81, the ground 86 (soft ground) and the suspension (not shown) and tires 65 of the vehicle 81, and the vehicle longitudinal axis of the vehicle 81, the oscillation of the crane vehicle 80 is detected.

Hereinbelow, as in the second embodiment, every fixed period during crane work, the lateral rollover limit height $l_{max}$, the center-of-gravity height "l", and the center-of-gravity distance, "s", are calculated, being indicated on the reporting part 34, and by observing the difference between the lateral rollover limit height $l_{max}$ and the center-of-gravity height in the up-down direction, "l", it is determined whether there is the danger of lateral rollover or not, with a lateral rollover warning being outputted from the reporting part 34 if there is the danger of lateral rollover.

It is obvious that the present invention is not limited to the above respective embodiments, and within the technical scope of the present invention, the respective embodiments may be altered as appropriate. In addition, the number, location, geometry, and the like, of the above-mentioned component members are not limited to those as given in the embodiments, and may be altered into a number, location, geometry, and the like, which are suited for implementing the present invention. In each figure, the same component is provided with the same sign.

DESCRIPTION OF SYMBOLS

The symbol 1 denotes an oscillation detecting device; 3, 3a a data processing apparatus; 10 a placement board; 11 a bottom plate; 12 a spring; 13 an acceleration sensor; 14 an angular velocity sensor; 15 an A-D converter; 16 an oscillation central axis; 21 an X-axis restriction guide part; 31 an arithmetic part; 32 a storage part; 33 an operation part; 34 a reporting part; 35 a reception part; 36 a bus; 37 a lateral rollover determination part; 40 a detection object; 50, 50a a reporting screen; 51 a graph; 52 an illustration; 53 a shaded area; 60 a trailer truck; 61 a container; 62 a load-carrying platform; 63 a container chassis; 64 a tractor; 65 a tire; 66 a road surface; 70 an oscillation detector; 80 a crane vehicle; 81 a vehicle; 82 a mounting surface; 83 a swivel base; 84 a telescoping boom; 85 an outrigger; 86 a ground; and 87 a hoisted cargo.

The invention claimed is:

1. A lateral rollover limit detection system, comprising:
    a structure, wherein a reference plane is supported with elastic forces on both sides of a reference axis;
    an up-down direction means for detecting a reciprocating motion in an up-down direction of said reference plane; and
    a calculating means for calculating, on the basis of a distance between said elastic forces supporting said structure on both sides of said reference axis, and the detection result by said up-down direction means, a limit center-of-gravity height beyond which said structure is rolled over in said direction of rotation as a lateral rollover limit height upon the center of gravity of said structure being on said reference axis,
    wherein said calculation means calculates a center-of-gravity height beyond which the force in said direction of rotation acting on the center of gravity of said structure resulting from said elastic force is not capable of providing a righting movement against the gravity, as said lateral rollover limit height,
    wherein said system further comprises a direction-of-rotation detection means for detecting a rotation around said reference axis of said reference plane, wherein said calculating means calculates said lateral rollover limit height for a center-of-gravity location on said reference plane of said structure, using an inclination angle of said reference plane in a standstill state determined from the detection result by said rotation-direction detection means, and
    wherein said calculation means determines the central angle for the oscillation around said reference axis from the detection result by said rotation-direction detection means as said inclination angle in a standstill state;
    wherein said calculation means determines a vertical oscillation frequency in the up-down direction for said reference plane from the detection result by said up-down direction detection means, and on the basis of said vertical oscillation frequency and the central angle for said oscillation, calculate said lateral rollover limit height.

2. The lateral rollover limit detection system according to claim 1, wherein said calculation means calculates a center-of-gravity height in said up-down direction from said reference axis to the center of gravity of said structure on the basis of the detection results by said up-down direction detection means and said direction of rotation detection means.

3. The lateral rollover limit detection system according to claim 2, comprising a lateral rollover determination means for determining the lateral rollover danger in said direction of rotation of said structure on the basis of said lateral rollover limit height which has been calculated by said calculation means and said center-of-gravity height, and a reporting means for reporting the determination result by said lateral rollover determination means.

* * * * *